(12) United States Patent
Oak et al.

(10) Patent No.: US 11,202,331 B2
(45) Date of Patent: Dec. 14, 2021

(54) DEVICE AND METHOD FOR MANAGING CONNECTIONS IN WIRELESS COMMUNICATION SYSTEM

(71) Applicant: Samsung Electronics Co., Ltd., Suwon-si (KR)

(72) Inventors: Jeongyeob Oak, Suwon-si (KR); Jisoo Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 34 days.

(21) Appl. No.: 16/764,683

(22) PCT Filed: Nov. 16, 2018

(86) PCT No.: PCT/KR2018/014045
§ 371 (c)(1),
(2) Date: May 15, 2020

(87) PCT Pub. No.: WO2019/098725
PCT Pub. Date: May 23, 2019

(65) Prior Publication Data
US 2021/0160946 A1  May 27, 2021

Related U.S. Application Data

(60) Provisional application No. 62/587,091, filed on Nov. 16, 2017.

(30) Foreign Application Priority Data

Apr. 10, 2018  (KR) ........................ 10-2018-0041598

(51) Int. Cl.
*H04W 76/18* (2018.01)
*H04W 76/19* (2018.01)
(Continued)

(52) U.S. Cl.
CPC ............ *H04W 76/18* (2018.02); *H04W 76/11* (2018.02); *H04W 76/19* (2018.02); *H04W 76/27* (2018.02); *H04W 80/02* (2013.01)

(58) Field of Classification Search
CPC ..... H04W 76/18; H04W 76/19; H04W 76/11; H04W 76/27; H04W 80/02;
(Continued)

(56) References Cited

U.S. PATENT DOCUMENTS 8,576,794 B1 * 11/2013 Dinan ............... H04W 72/0406
370/330
2016/0309379 A1  10/2016 Pelletier et al.
2019/0132790 A1  5/2019 Lee et al.

FOREIGN PATENT DOCUMENTS

EP      3 685 624 A1    7/2020
WO   2017/171354 A1   10/2017
WO   2019/066573 A1    4/2019

OTHER PUBLICATIONS

Han, Shuangfeng, et al. "Big data enabled mobile network design for 5G and beyond." IEEE Communications Magazine 55.9 (2017): 150-157. (Year: 2017).*

(Continued)

*Primary Examiner* — Sharad Rampuria
(74) *Attorney, Agent, or Firm* — Jefferson IP Law, LLP

(57) ABSTRACT

The present disclosure relates to a 5$^{th}$ generation (5G) or pre-5G communication system for supporting a higher data transmission rate than a 4$^{th}$ generation (4G) communication system such as long term evolution (LTE). The present disclosure is to manage connections in a wireless communication system, and an operating method of a distributed unit of a base station may include receiving a first control message processed by a central unit from a terminal, transmitting to the central unit the first control message modified to indicate rejection of a procedure requested by the first (Continued)

control message, and in response to the modified first control message, receiving a second control message indicating the procedure rejection.

17 Claims, 23 Drawing Sheets

(51) Int. Cl.
*H04W 76/11* (2018.01)
*H04W 76/27* (2018.01)
*H04W 80/02* (2009.01)

(58) Field of Classification Search
CPC ... H04W 88/085; H04W 72/04; H04W 72/12; H04W 76/00; H04B 7/2121; H04B 7/2123; H04J 2203/0069; H04Q 2213/394
See application file for complete search history.

(56) References Cited

OTHER PUBLICATIONS

Samsung, RRC connection resume procedure considering CU-DU split, 3GPP TSG-RAN WG3 Meeting #98, Nov. 27-Dec. 1, 2017, Reno, USA.
Samsung, RRC connection reestablishment procedure considering CU-DU split, 3GPP TSG-RAN WG3 Meeting #98, Nov. 27-Dec. 1, 2017, Reno, USA.
Ericsson, DU admission results in Initial UL RRC Message Transfer, 3GPP TSG RAN WG3 Meeting #98 Tdoc, R3-175018, Nov. 27-Dec. 1, 2017, Reno, Nevada, USA.
3rd Generation Partnership Project; Technical Specification Group Radio Access Network; NG-RAN; F1 application protocol (F1AP) (Release 15), 3GPP TS 38.473 V15.3.0, Sep. 2018, Sophia Antipolis, France.
Huawei, F1AP procedures for RRC Connection Setup, 3GPP TSG-RAN3 Meeting #96, R3-171846, May 6, 2017, Hangzhou, China.
3rd Generation Partnership Project; Technical Specification Group Radio Access Network; NG-RAN; Architecture description (Release 15), 3GPP TS 38.401 V0.4.1, Nov. 10, 2017, pp. 12-14.
ZTE, RRC message transmission over F1 interface for TS38.473, 3GPP TSG RAN WG3 NR#97bis, R3-173660, Sep. 29, 2017, Prague, Czech, pp. 1-4.
LG Electronics Inc., Issues on RRC-INACTIVE state in CU-DU split, 3GPP TSG-RAN WG3 Meeting #97bis, R3-173874, Prague, Czech Republic, pp. 1-6.
Samsung, Discussions on initial access procedure within high-layer split, 3GPP TSG-RAN WG3 Meeting #97bis, R3-173847, Oct. 9, 2017, Prague, Czech.
European Search Report dated Oct. 20, 2020, issued in European Application No. 18879216.2.

* cited by examiner

DEVICE AND METHOD FOR MANAGING CONNECTIONS IN WIRELESS COMMUNICATION SYSTEM

TECHNICAL FIELD

The present disclosure generally relates to a wireless communication system, and more specifically, to an apparatus and method for managing connections in the wireless communication system.

BACKGROUND ART

To satisfy a wireless data traffic demand which is growing after a 4th generation (4G) communication system is commercialized, efforts are exerted to develop an advanced 5th generation (5G) communication system or a pre-5G communication system. For this reason, the 5G communication system or the pre-5G communication system is referred to as a beyond 4G network communication system or a post long term evolution (LTE) system.

To achieve a high data rate, the 5G communication system considers its realization in an extremely high frequency (mmWave) band (e.g., 60 GHz band). To mitigate a path loss of propagation and to extend a propagation distance in the extremely high frequency band, the 5G communication system is discussing beamforming, massive multiple input multiple output (MIMO), full dimensional (FD)-MIMO, array antenna, analog beam-forming, and large scale antenna techniques.

Also, for network enhancement of the system, the 5G communication system is developing techniques such as evolved small cell, advanced small cell, cloud radio access network (RAN), ultra-dense network, device to device (D2D) communication, wireless backhaul, moving network, cooperative communication, coordinated multi-points (CoMP), and receive interference cancellation.

Besides, the 5G system is working on hybrid frequency shift keying and quadrature amplitude modulation (FQAM) and sliding window superposition coding (SWSC) as advanced coding modulation (ACM) schemes, and filter bank multi carrier (FBMC), non orthogonal multiple access (NOMA), and sparse code multiple access (SCMA) as advanced access technologies.

In the 5G system, various network structures are discussed for efficiency of the system operation. For example, network virtualization, split of a base station into a central unit (CU) and a distributed unit (DU) are discussed. Accordingly, an operating scheme adequate for the new network structure requires further studies.

DISCLOSURE OF INVENTION

Technical Problem

Based on the discussions described above, the present disclosure provides an apparatus and a method for efficiently managing connections in a wireless communication system.

Also, the present disclosure provides an apparatus and a method for managing connections in an environment where a base station is split into a central unit (CU) and a distributed unit (DU) in a wireless communication system.

Also, the present disclosure provides an apparatus and a method for processing a control message according to a resource status of a distributed unit of a base station in a wireless communication system.

Solution to Problem

According to various embodiments of the present disclosure, an operating method of a distributed unit of a base station in a wireless communication system may include receiving a first control message processed by a central unit from a terminal, transmitting to the central unit the first control message modified to indicate rejection of a procedure requested by the first control message, and in response to the modified first control message, receiving a second control message indicating the procedure rejection.

According to various embodiments of the present disclosure, an operating method of a central unit of a base station in a wireless communication system may include receiving a first control message generated by a terminal from a distributed unit, and in response to identifying that the first control message is modified to indicate rejection of a procedure requested by the first control message, transmitting a second control message indicating rejection of the procedure.

According to various embodiments of the present disclosure, an operating method of a distributed unit of a base station in a wireless communication system may include receiving a first control message processed by a central unit from a terminal, transmitting to the central unit the first control message, in response to the first control message, receiving a second control message indicating to perform the procedure, in response to determining to reject a procedure requested by the first control message, dropping the second control message, and transmitting a third control message corresponding to the procedure rejection to the central unit.

According to various embodiments of the present disclosure, an apparatus of a distributed unit of a base station in a wireless communication system may include a transceiver for transmitting and receiving signals, and at least one processor for controlling the transceiver. The transceiver may receive a first control message processed by a central unit from a terminal, transmit to the central unit the first control message modified to indicate rejection of a procedure requested by the first control message, and in response to the modified first control message, receive a second control message indicating the procedure rejection.

According to various embodiments of the present disclosure, an apparatus of a central unit of a base station in a wireless communication system may include a transceiver for transmitting and receiving signals, and at least one processor for controlling the transceiver. The transceiver may receive a first control message generated by a terminal from a distributed unit, and in response to identifying that the first control message is modified to indicate rejection of a procedure requested by the first control message, transmit a second control message indicating rejection of the procedure.

According to various embodiments of the present disclosure, an apparatus of a distributed unit of a base station in a wireless communication system may include a transceiver for transmitting and receiving signals, and at least one processor for controlling the transceiver. The at least one processor may control to receive a first control message processed by a central unit from a terminal, transmit to the central unit the first control message, in response to the first control message, receive a second control message indicating to perform the procedure, in response to determining to reject a procedure requested by the first control message, drop the second control message, and transmit a third control message corresponding to the procedure rejection to the central unit.

Advantageous Effects of Invention

An apparatus and method according to various embodiments of the present disclosure may efficiently manage connections, by processing a control message according to a resource status of a distributed unit of a base station.

Effects obtainable from the present disclosure are not limited to the above-mentioned effects, and other effects which are not mentioned may be clearly understood by those skilled in the art of the present disclosure through the following descriptions.

BEST MODE FOR CARRYING OUT THE INVENTION

Terms used in the present disclosure are used for describing particular embodiments and are not intended to limit the scope of other embodiments. A singular form may include a plurality of forms unless it is explicitly differently represented. All the terms used herein, including technical and scientific terms, may have the same meanings as terms generally understood by those skilled in the art to which the present disclosure pertains. Among terms used in the present disclosure, the terms defined in a general dictionary may be interpreted to have the same or similar meanings with the context of the relevant art, and, unless explicitly defined in this disclosure, it shall not be interpreted ideally or excessively as formal meanings. In some cases, even terms defined in this disclosure should not be interpreted to exclude the embodiments of the present disclosure.

In various embodiments of the present disclosure to be described below, a hardware approach will be described as an example. However, since the various embodiments of the present disclosure include a technology using both hardware and software, the various embodiments of the present disclosure do not exclude a software-based approach.

Hereafter, the present disclosure relates to an apparatus and a method for managing connections in a wireless communication system. Specifically, the present disclosure explains a technique for managing connections in an environment where a base station is split into a central unit (CU) and a distributed unit (DU) in the wireless communication system.

Terms indicating signals, terms indicating channels, terms indicating control information, terms indicating network entities, terms indicating components of an apparatus, and terms indicating message and information elements in the message, which are used in the following descriptions, are for the sake of explanations. Accordingly, the present disclosure is not limited to the terms to be described, and may use other terms having technically identical meaning.

In addition, the present disclosure describes various embodiments using terms used in some communication standards (e.g., 3rd generation partnership project (3GPP)), which are merely exemplary for explanations. Various embodiments of the present disclosure may be easily modified and applied in other communication systems.

Figure 1:
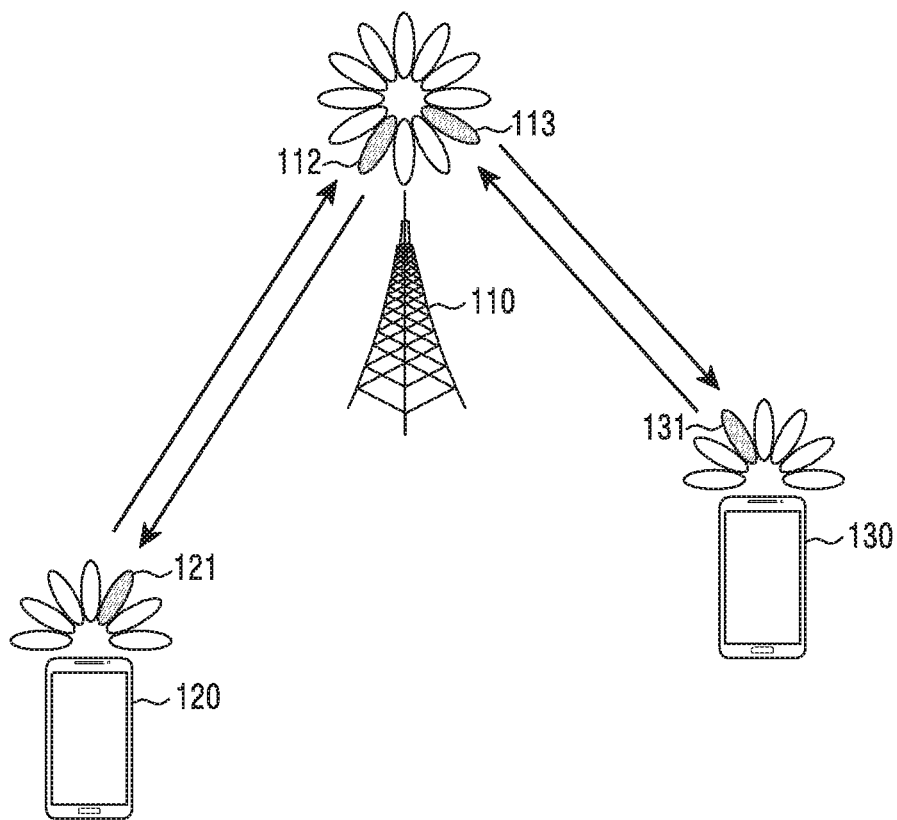
FIG. 1 illustrates a wireless communication system according to various embodiments of the present disclosure.

FIG. 1 illustrates a wireless communication system according to various embodiments of the present disclosure. FIG. 1 depicts a base station 110, a terminal 120, and a terminal 130, as some of nodes which use a radio channel in the wireless communication system. While FIG. 1 depicts only one base station, other base station which is identical or similar to the base station 110 may be further included.

The base station 110 is a network infrastructure for providing radio access to the terminals 120 and 130. The base station 110 has coverage defined as a specific geographical area based on a signal transmission distance. The base station 110 may be referred to as, besides the base station, an access point (AP), an eNodeB (eNB), a next generation nodeB (gNB), a 5th generation node (5G node), a wireless point, a transmission/reception point (TRP), or other terms having technically identical meaning.

The terminal 120 and the terminal 130 each are a device used by a user, and communicate with the base station 110 over a radio channel. In some cases, at least one of the terminal 120 and the terminal 130 may operate without user's involvement. That is, at least one of the terminal 120 and the terminal 130 is a device which performs machine type communication (MTC), and may not be carried by the user. The terminal 120 and the terminal 130 each may be referred to as, besides the terminal, a user equipment (UE), a mobile station, a subscriber station, a remote terminal, a wireless terminal, a user device, or other term having a technically equivalent meaning.

The base station 110, the terminal 120, and the terminal 130 may transmit and receive radio signals in a millimeter wave (mmWave) band (e.g., 28 GHz, 30 GHz, 38 GHz, 60 GHz). In so doing, to improve channel gain, the base station 110, the terminal 120, and the terminal 130 may conduct beamforming. Herein, the beamforming may include transmit beamforming and receive beamforming. That is, the base station 110, the terminal 120, and the terminal 130 may apply directivity to a transmit signal or a received signal. For doing so, the base station 110 and the terminals 120 and 130 may select serving beams 112, 113, 121, and 131 through a beam search or beam management procedure. After the serving beams 112, 113, 121, and 131 are selected, communications may be performed using resources which are quasi co-located (QCL) with resources which carry the serving beams 112, 113, 121, and 131.

If large-scale properties of a channel which carries a symbol on a first antenna port may be inferred from a channel which carries a symbol on a second antenna port, the first antenna port and the second antenna port may be said to be QCL. For example, the large-scale properties may include at least one of delay spread, Doppler spread, Doppler shift, average gain, average delay, and spatial receiver parameter.

In the example described with reference to FIG. 1, the base station 110 has been described as a single device. However, the base station 110 may be implemented to be divided into two or more devices. For example, a base station may include one central unit and at least one distributed unit. The structure of the base station divided into the central unit and the distributed unit may be referred to as a 'CU-DU split structure'. The central unit and the distributed unit may be distinguished in terms of protocol layers, and its example is shown in FIG. 2 below.

Figure 2:
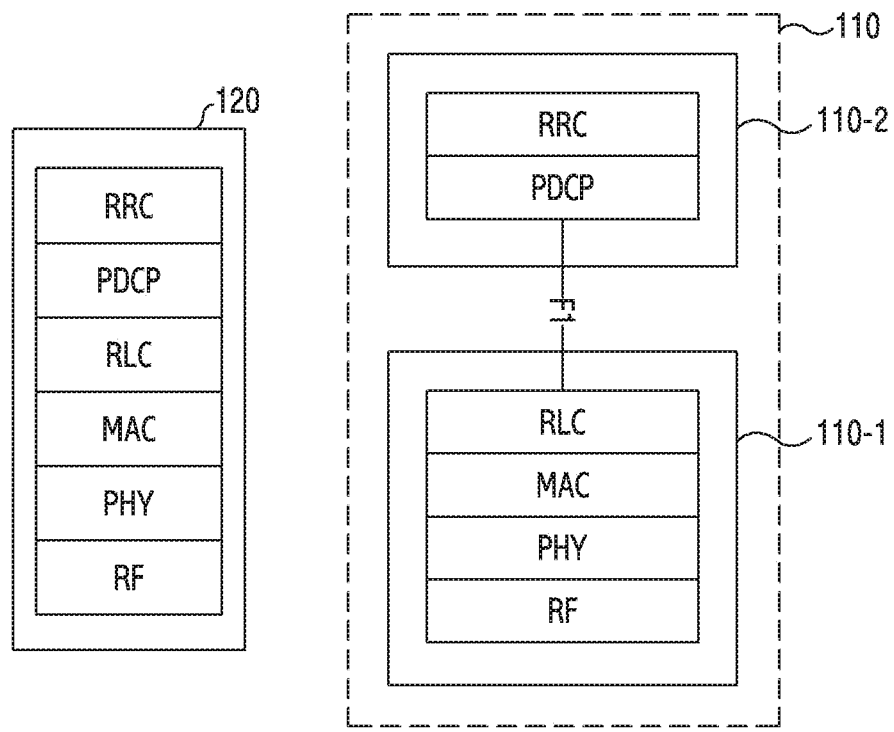
FIG. 2 illustrates a protocol stack of a terminal and a base station in a wireless communication system according to various embodiments of the present disclosure.

FIG. 2 illustrates a protocol stack of a terminal and a base station in a wireless communication system according to various embodiments of the present disclosure. FIG. 2 illustrates the protocol structure for control, that is, of a control plane. Referring to FIG. 2, the terminal 120 processes layers such as radio frequency (RF), physical (PHY), media access control (MAC), radio link control (RLC), packet data convergence protocol (PDCP), and radio resource control (RRC). A distributed unit 110-1 of the base station 110 processes layers such as RF, PHY, MAC, and RLC, and a central unit 110-2 of the base station 110 processes layers such as PDCH and RRC. An interface between the distributed unit 110-1 and the central unit 110-2 may be referred to as 'F1'.

Figure 3:
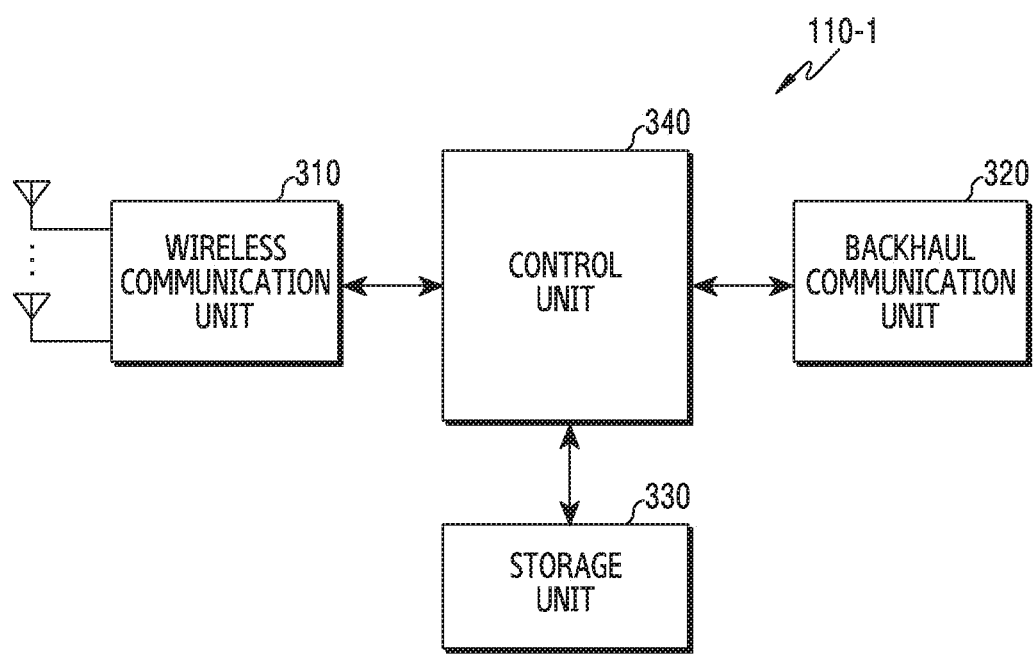
FIG. 3 illustrates a configuration of a distributed unit (DU) of a base station in a wireless communication system according to various embodiments of the present disclosure.

FIG. 3 illustrates a configuration of a central unit of a base station in a wireless communication system according to various embodiments of the present disclosure. The configuration in FIG. 3 may be understood as the configuration of the distrusted unit 110-1 of the base station 110. A term such as 'portion' or '~er' used hereafter indicates a unit for processing at least one function or operation, and may be implemented using hardware, software, or a combination of hardware and software.

Referring to FIG. 3, the distributed unit includes a wireless communication unit 310, a backhaul communication unit 320, a storage unit 330, and a control unit 340.

The wireless communication unit 310 may perform functions for transmitting and receiving signals over a radio channel. For example, the wireless communication unit 310 performs a conversion function between a baseband signal and a bit string according to a physical layer standard of the system. For example, in data transmission, the wireless communication unit 310 generates complex symbols by encoding and modulating a transmit bit string. Also, in data reception, the wireless communication unit 310 restores a receive bit string by demodulating and decoding a baseband signal.

Also, the wireless communication unit 310 up-converts the baseband signal to an RF band signal, transmits it via an antenna, and down-converts an RF band signal received via an antenna to a baseband signal. For doing so, the wireless communication unit 310 may include a transmit filter, a receive filter, an amplifier, a mixer, an oscillator, a digital to analog convertor (DAC), an analog to digital convertor (ADC), and so on. In addition, the wireless communication unit 310 may include a plurality of transmit and receive paths. Further, the wireless communication unit 310 may include at least one antenna array including a plurality of antenna elements.

In terms of the hardware, the wireless communication unit 310 may include a digital unit and an analog unit, and the analog unit may include a plurality of sub-units according to an operating power and an operating frequency. The digital unit may be implemented with at least one processor (e.g., a digital signal processor (DSP)).

The wireless communication unit 310 transmits and receives the signals as stated above. Hence, whole or part of the wireless communication unit 310 may be referred to as 'a transmitter', 'a receiver', or 'a transceiver'. Also, in the following, the transmission and the reception over the radio channel is used as the meaning which embraces the above-stated processing of the wireless communication unit 310.

The backhaul communication unit 320 provides an interface for communicating with other nodes in the network. That is, the backhaul communication unit 320 converts a bit sting transmitted from the distributed unit to another node, for example, to the central unit, another access node, another distributed unit, an upper node, or a core network, to a physical signal, and converts a physical signal received from the another node to a bit string.

The storage unit 330 stores a basic program for operating the distributed unit, an application program, and data such as setting information. The storage unit 330 may include a volatile memory, a non-volatile memory, or a combination of a volatile memory and a non-volatile memory. The storage unit 330 provides the stored data at a request of the control unit 340.

The control unit 240 controls general operations of the distributed unit. For example, the control unit 340 transmits and receives signals through the wireless communication unit 310 or the backhaul communication unit 320. Also, the control unit 340 records and reads data in and from the storage unit 330. The control unit 340 may execute functions of the protocol stack requested by a communication standard. According to another embodiment, the protocol stack may be included in the wireless communication unit 310. For doing so, the control unit 340 may include at least one processor.

According to various embodiments, the control unit 340 may manage connections of terminals. For example, the control unit 340 may determine whether to accept a procedure requested by a control message of an upper layer, and may control an operation for informing a determination result to the central unit. According to an embodiment, the control unit 340 may control to receive the control message processed by the central unit from the terminal, receive a first control message processed by the central unit from the terminal, transmit to the central unit the first control message modified to indicate rejection of the procedure requested by the first control message, and receive a second control message indicating the procedure rejection in response to the modified first control message. According to another embodiment, the control unit 340 may control to receive a first control message processed by the central unit from the terminal, transmit the first control message to the central unit, receive a second control message indicating to perform the procedure requested by the first control message, drop the second control message in response to determining to reject the procedure requested by the first control message, and transmit a third control message corresponding to the procedure rejection to the central unit. For example, the control unit 340 may control the distributed unit to perform operations according to various embodiments described below.

Figure 4:
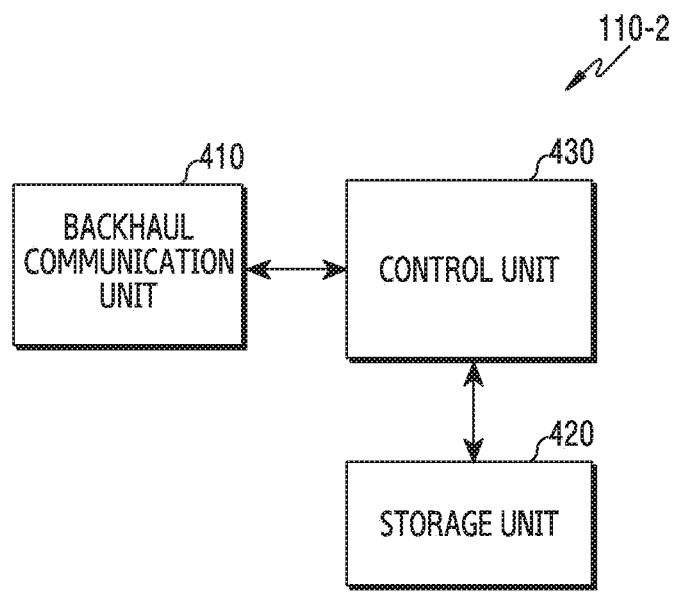
FIG. 4 illustrates a configuration of a central unit (CU) of a base station in a wireless communication system according to various embodiments of the present disclosure.

FIG. 4 illustrates a configuration of a central unit of a base station in a wireless communication system according to various embodiments of the present disclosure. The configuration illustrated in FIG. 4 may be understood as the configuration of the central unit 110-2 of the base station 110. A term such as 'portion' or '~er' used hereafter indicates a unit for processing at least one function or operation, and may be implemented using hardware, software, or a combination of hardware and software.

Referring to FIG. 4, the central unit includes a backhaul communication unit 410, a storage unit 420, and a control unit 430.

The backhaul communication unit 410 provides an interface for communicating with other nodes in the network. That is, the backhaul communication unit 410 converts a bit sting transmitted from the central unit to another node, for example, to the distributed unit, another access node, another central unit, an upper node, or a core network, to a physical signal, and converts a physical signal received from the another node to a bit string. The backhaul communication unit 410 transmits and receives the signals as stated above. Hence, whole or part of the backhaul communication unit 410 may be referred to as 'a transmitter', 'a receiver', or 'a transceiver'.

The storage unit 420 stores a basic program for operating the central unit, an application program, and data such as setting information. The storage unit 420 may include a volatile memory, a non-volatile memory, or a combination of a volatile memory and a non-volatile memory. The storage unit 420 provides the stored data according to a request of the control unit 430.

The control unit 430 controls general operations of the central unit. For example, the control unit 430 transmits and receives signals through the backhaul communication unit 410. Also, the control unit 430 records and reads data in and from the storage unit 420. The control unit 430 may execute functions of a protocol stack required by a communication standard, that is, functions of PDCP and RRC layers. For doing so, the control unit 430 may include at least one processor.

According to various embodiments, the control unit 430 may manage connections of terminals. According to various embodiments, the control unit 430 may manage the connection according to a control message received from the distributed unit. According to an embodiment, the control unit 430 may control to receive a first control message generated by the terminal from the distributed unit, and transmit a second control message indicating procedure rejection in response to identifying that the first control message is modified to indicate rejection of a procedure requested by the first control message. For example, the control unit 430 may control the central unit to carry out operations to be explained according to various embodiments.

Figure 5:
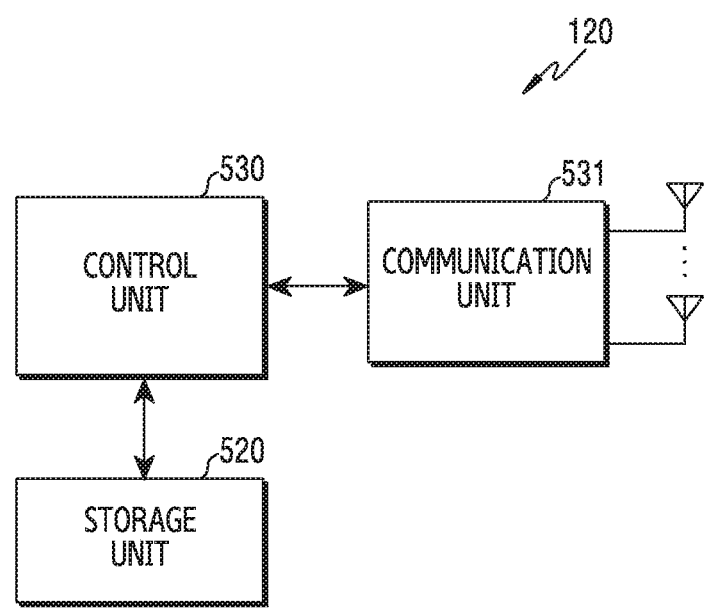
FIG. 5 illustrates a configuration of a terminal in a wireless communication system according to various embodiments of the present disclosure.

FIG. 5 illustrates a configuration of a terminal in a wireless communication system according to various embodiments of the present disclosure. The configuration illustrated in FIG. 5 may be understood as the configuration of the terminal 120. A term such as 'portion' or '~er' used hereafter indicates a unit for processing at least one function or operation, and may be implemented using hardware, software, or a combination of hardware and software.

Referring to FIG. 5, the terminal includes a communication unit 510, a storage unit 520, and a control unit 530.

The communication unit 510 may perform functions for transmitting and receiving signals over a radio channel. For example, the communication unit 510 performs a conversion function between a baseband signal and a bit string according to a physical layer standard of the system. For example, in data transmission, the communication unit 510 generates complex symbols by encoding and modulating a transmit bit string. Also, in data reception, the communication unit 510 restores a receive bit string by demodulating and decoding a baseband signal. Also, the communication unit 510 up-converts the baseband signal to an RF band signal, transmits it via an antenna, and down-converts an RF band signal received via an antenna to a baseband signal. For example, the communication unit 510 may include a transmit filter, a receive filter, an amplifier, a mixer, an oscillator, a DAC, an ADC, and so on.

In addition, the communication unit 510 may include a plurality of transmit and receive paths. Further, the communication unit 510 may include at least one antenna array including a plurality of antenna elements. In terms of the hardware, the communication unit 510 may include a digital circuit and an analog circuit (e.g., radio frequency integrated circuit (RFIC)). Herein, the digital circuit and the analog circuit may be implemented as a single package. In addition, the communication unit 510 may include a plurality of RF chains. Further, the communication unit 510 may perform beamforming.

The communication unit 510 transmits and receives the signals as stated above. Hence, whole or part of the communication unit 510 may be referred to as 'a transmitter', 'a receiver', or 'a transceiver'. Also, in the following, the transmission and the reception over the radio channel is used as the meaning which embraces the above-stated processing of the communication unit 510.

The storage unit 520 stores a basic program for operating the terminal, an application program, and data such as setting information. The storage unit 520 may include a volatile memory, a non-volatile memory, or a combination of a volatile memory and a non-volatile memory. The storage unit 520 provides the stored data at a request of the control unit 520.

The control unit 530 controls general operations of the terminal. For example, the control unit 530 transmits and receives signals through the communication unit 510. Also, the control unit 530 records and reads data in and from the storage unit 520. The control unit 530 may execute functions of a protocol stack requested by a communication standard. For doing so, the control unit 530 may include at least one processor or microprocessor, or part of a processor. Also, part of the communication unit 510 and the control unit 530 may be referred to as a communication processor (CP).

Figure 6:
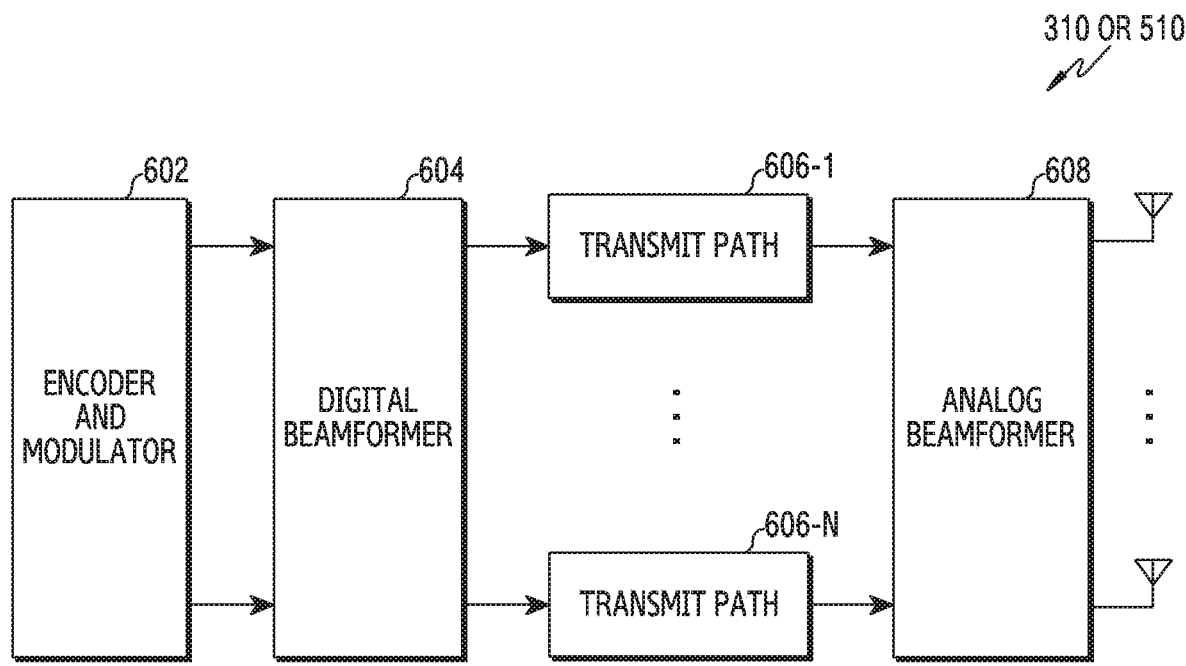
FIG. 6 illustrates a configuration of a communication unit in a wireless communication system according to various embodiments of the present disclosure.

FIG. 6 illustrates a configuration of a communication unit in a wireless communication system according to various embodiments of the present disclosure. FIG. 6 depicts an example of a detailed configuration of the wireless communication unit 310 of FIG. 3 or the communication unit 510 of FIG. 5. More specifically, FIG. 6 illustrates components for performing beamforming, as part of the wireless communication unit 310 of FIG. 3 or the communication unit 510 of FIG. 5.

Referring to FIG. 6, the wireless communication unit 210 or the communication unit 310 includes an encoder and modulator 602, a digital beamformer 604, a plurality of transmit paths 606-1 through 606-N, and an analog beamformer 608.

The encoder modulator 602 performs channel encoding. For the channel encoding, at least one of low density parity check (LDPC) code, convolution code, and polar code may be used. The encoder and modulator 602 generates modulation symbols by performing constellation mapping.

The digital beamformer 604 performs the beamforming on a digital signal (e.g., the modulation symbols). For doing so, the digital beamformer 604 multiplies the modulation symbols by beamforming weights. Herein, the beamforming weights are used to change an amplitude and a phase of the signal, and may be referred to as a 'precoding matrix' or a 'precoder'. The digital beamformer 604 outputs the digital-beamformed modulation symbols to the transmit paths 606-1 through 606-N. In so doing, according to a multiple input multiple output (MIMO) transmission scheme, the modulation symbols may be multiplexed or the same modulation symbols may be provided to the transmit paths 606-1 through 606-N.

The transmit paths 606-1 through 606-N convert the digital-beamformed digital signals to analog signals. For doing so, the transmit paths 606-1 through 606-N each may include an inverse fast Fourier transform (IFFT) operator, a cyclic prefix (CP) adder, a DAC, and an up-converter. The CP adder is used for an orthogonal frequency division multiplexing (OFDM) scheme, and may be excluded if other physical layer scheme (e.g., filter bank multi-carrier (FBMC)) is applied. That is, the transmit paths 606-1 through 606-N provide an independent signal process for a plurality of streams generated through the digital beamforming Yet, depending on the implementation, some of the components of the transmit paths 606-1 through 606-N may be used in common.

The analog beamformer 608 beamforms the analog signals. For doing so, the digital beamformer 604 multiplies the analog signals by the beamforming weights. Herein, the beamforming weights are used to change the amplitude and the phase of the signal. More specifically, the analog beamformer 608 may be configured variously, according to a connection structure between the transmit paths 606-1 through 606-N and the antennas. For example, the plurality of the transmit paths 606-1 through 606-N each may be connected with one antenna array. As another example, the plurality of the transmit paths 606-1 through 606-N may be connected with one antenna array. As yet another example, the plurality of the transmit paths 606-1 through 606-N may be adaptively connected with one antenna array, or connected with two or more antenna arrays.

In a system according to various embodiments, the terminal may operate in various states. For example, the terminal may operate in one of an RRC connected state, an RRC idle state, or an RRC inactive state. The RRC connected state may be referred to as an RRC 'active state' or an 'RRC normal state'. In the RRC connected state, all the protocol layers of the terminal are activated, and the terminal may transmit/receive data. In the RRC idle state, the protocol layers of the terminal are deactivated and resources on a core network are released. However, in the RRC idle state, the terminal may perform operations such as broadcast information reception, tracking area (TA) update, paging reception, and so on.

In the RRC inactive state, the protocol layers of the terminal are deactivated, but the connection between the terminal and the core network is maintained. That is, in the RRC inactive state, the connection with the core network is similar to the RRC connected state. The RRC inactive state separately manages the state of the terminal in a radio access network (RAN), separately from managing the idle state in the core network, and thus enables the terminal to maintain access stratum (AS) context and to transit to the connected state faster. With the introduction of the RRC inactive state, various applications such as connectionless data transmission for small data within the inactive state as well as terminal power consumption reduction may be implemented.

The terminal may transit between the RRC connected state, the RRC idle state, and the RRC idle state according to a given condition. For example, if transmission data occurs at the terminal which is operating in the RRC inactive state or the RRC idle state, the terminal may request state transition, by transmitting a message for transiting to the RRC connected state. Examples of the procedure for the state transition are described below with reference to FIG. 7 and FIG. 8.

Figure 7:
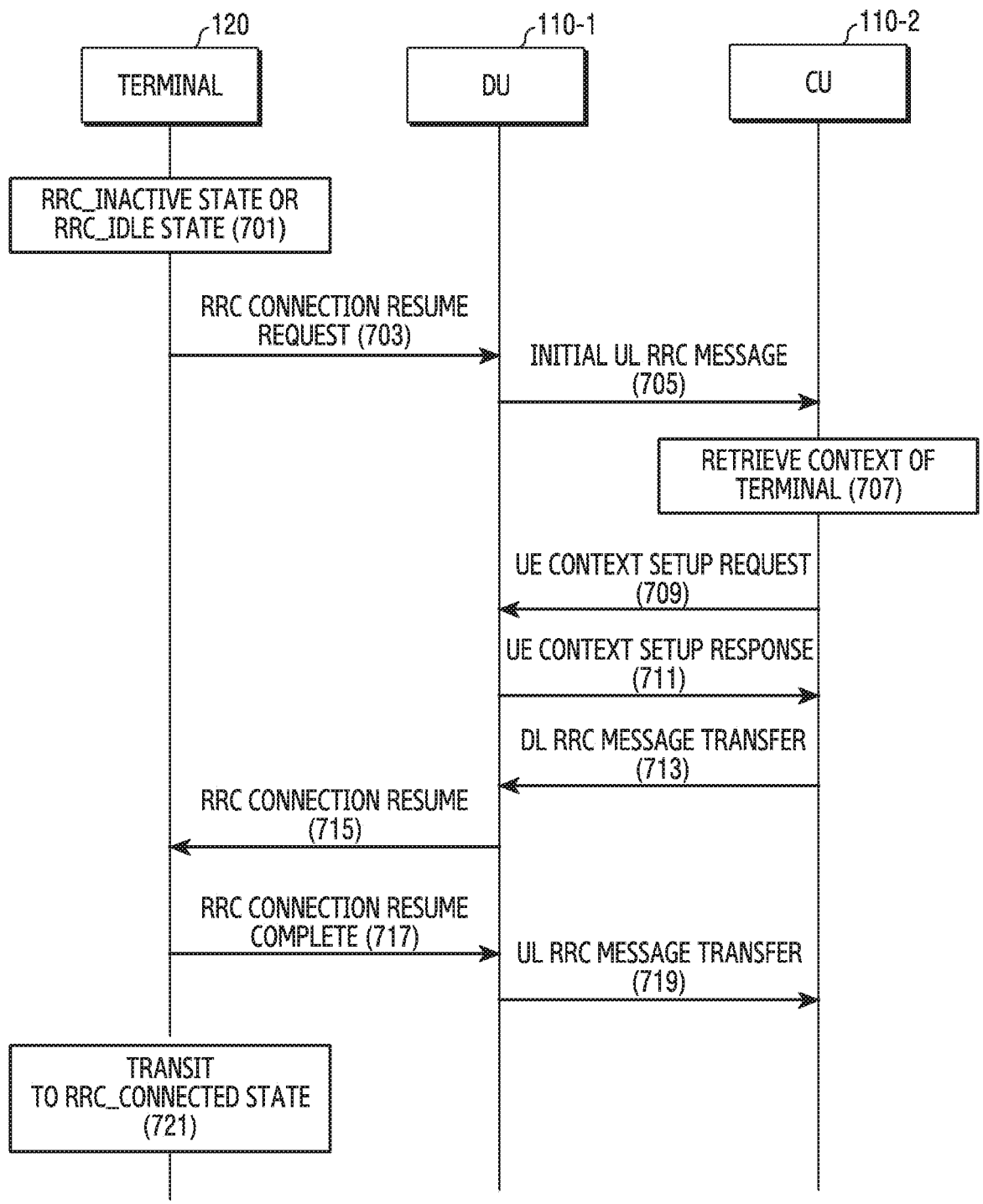
FIG. 7 illustrates a signal exchange diagram if context retrieval is successful in radio resource control (RRC) state transition in a wireless communication system according to various embodiments of the present disclosure.

FIG. 7 illustrates a signal exchange diagram if context retrieval is successful in RRC state transition in a wireless communication system according to various embodiments of the present disclosure. FIG. 7 illustrates signal exchanges between the terminal 120, the distributed unit 110-1 of the base station 110, and the central unit 110-2 of the base station 110.

Referring to FIG. 7, in step 701, the terminal 120 operates in the RRC inactive state or the RRC idle state. Next, in step 703, the terminal 120 transmits an RRC connection resume request message. That is, according to event occurrence such as generating data to transmit, the terminal 120 transmits a message requesting transition to the RRC connected state.

In step 705, the distributed unit 110-1 transmits an initial uplink RRC message to the central unit 110-2. The initial uplink RRC message includes the RRC connection resume request message transmitted from the terminal 120. The RRC connection resume request message received at the distributed unit 110-1 is data including a MAC header, an RLC header, and so on. Hence, for the received data, the distributed unit 110-1 may perform necessary processing in the MAC layer and the RLC layer, and include an RRC message (e.g., the RRC connection resume request) to transmit to the central unit in the initial uplink RRC message, and then transmit to the central unit 110-2. In addition, the initial uplink RRC message may further include at least one of identification information (e.g., cell-radio network temporary identity (C-RNTI)) of the terminal 120, and information relating to resource allocation configuration of the distributed unit 110-1. The initial uplink RRC message may be referred to as an 'F1-application protocol (AP) initial uplink RRC message transfer message'.

In step 707, the central unit 110-2 retrieves context of the terminal 120. Next, in step 709, the central unit 110-2 transmits a UE context setup request message to the distributed unit 110-1. In step 711, the distributed unit 110-1 transmits a UE context setup response message.

Next, in step 713, the central unit 110-2 transmits a downlink RRC message transfer message including the RRC connection resume message. In step 715, the distributed unit 110-1 transmits the RRC connection resume message. In step 717, the terminal 120 transmits an RRC connection resume complete message. In step 719, the distributed unit 110-1 transmits an uplink RRC message transfer message including the RRC connection resume complete message. Thus, in step 717, the terminal 120 transits to the RRC connected state.

Figure 8:
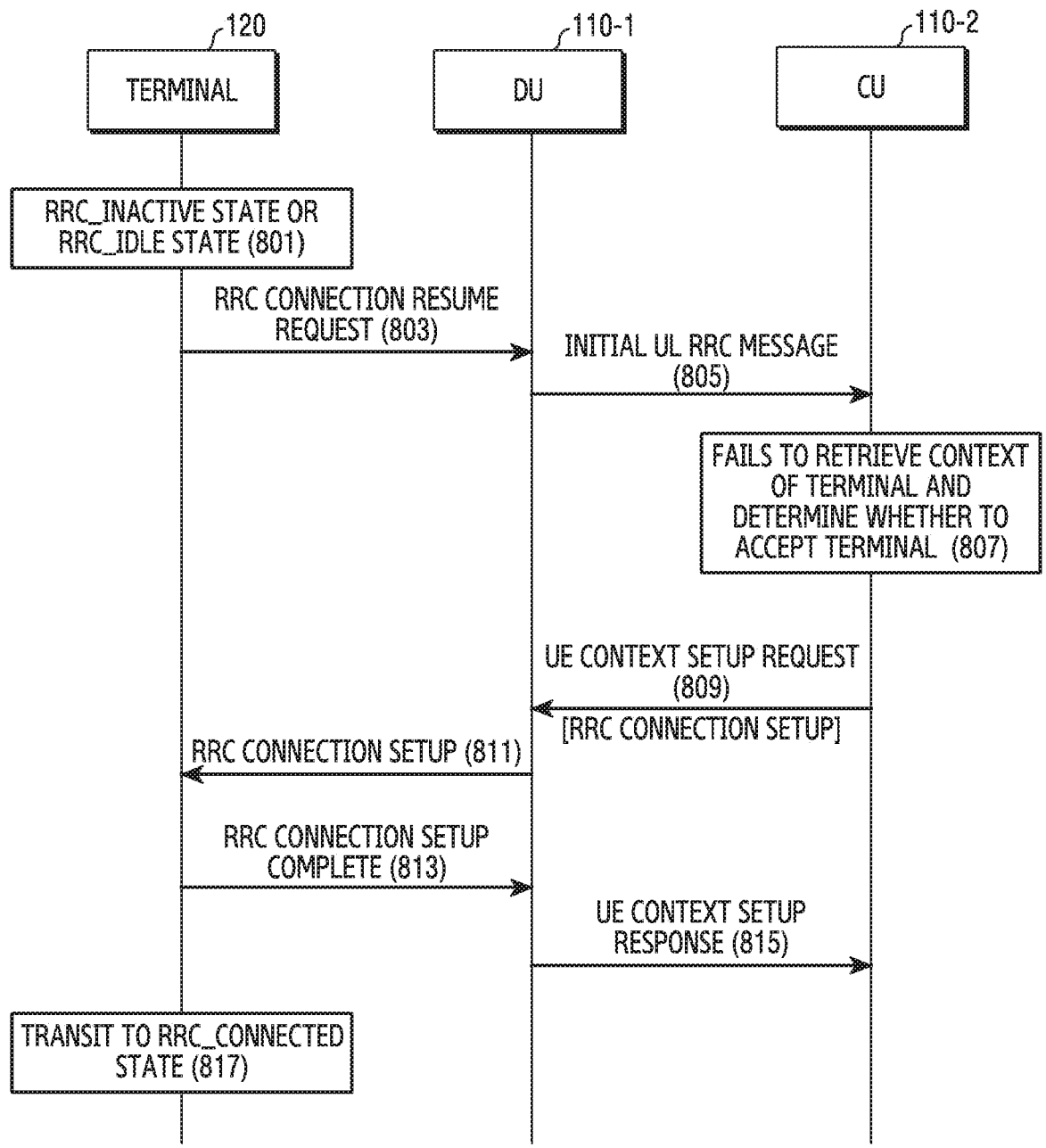
FIG. 8 illustrates a signal exchange diagram if context retrieval fails in RRC state transition in a wireless communication system according to various embodiments of the present disclosure.

FIG. 8 illustrates a signal exchange diagram if context retrieval fails in RRC state transition in a wireless communication system according to various embodiments of the present disclosure. FIG. 8 illustrates signal exchanges between the terminal 120, the distributed unit 110-1 of the base station 110, and the central unit 110-2 of the base station 110.

Referring to FIG. 8, in step 801, the terminal 120 operates in the RRC inactive state or the RRC idle state. Next, in step 803, the terminal 120 transmits an RRC connection resume request message. That is, according to event occurrence such as generating data to transmit, the terminal 120 transmits a message requesting transition to the RRC connected state. In step 805, the distributed unit 110-1 transmits an initial uplink RRC message to the central unit 110-2. The initial uplink RRC message includes the RRC connection resume request message transmitted from the terminal 120, and additionally, may further include at least one of identification information (e.g., C-RNTI) of the terminal 120 and resource allocation configuration information of the distributed unit 110-1.

In step 807, the central unit 110-2 fails to retrieve context of the terminal 120. The central unit 110-2 determines that the terminal 120 is acceptable. Hence, in step 809, the central unit 110-2 transmits a UE context setup message including an RRC connection setup message.

In step 811, the distributed unit 110-1 transmits the RRC connection setup message. In step 813, the terminal 120 transmits an RRC connection setup complete message. That is, the terminal 120 performs a necessary operation to establish an RRC connection, and then transmits a message indicating that the RRC connection is established. Next, in step 815, the distributed unit 110-1 transmits a UE context setup response message. For example, the UE context setup response message may include an RRC connection setup complete message. Thus, in step 717, the terminal 120 transits to the RRC connected state.

Through the procedure of FIG. 7 or FIG. 8, the terminal may transit from the RRC inactive state to the RRC connected state. However, accepting the request for the state transition of the terminal is not always guaranteed. For example, if hardware resources, logical resources, or physical resources, to be allocated, lack, the request for the state transition may be rejected. The case where the request for the state transition is rejected will be described with reference to FIG. 9.

Figure 9:
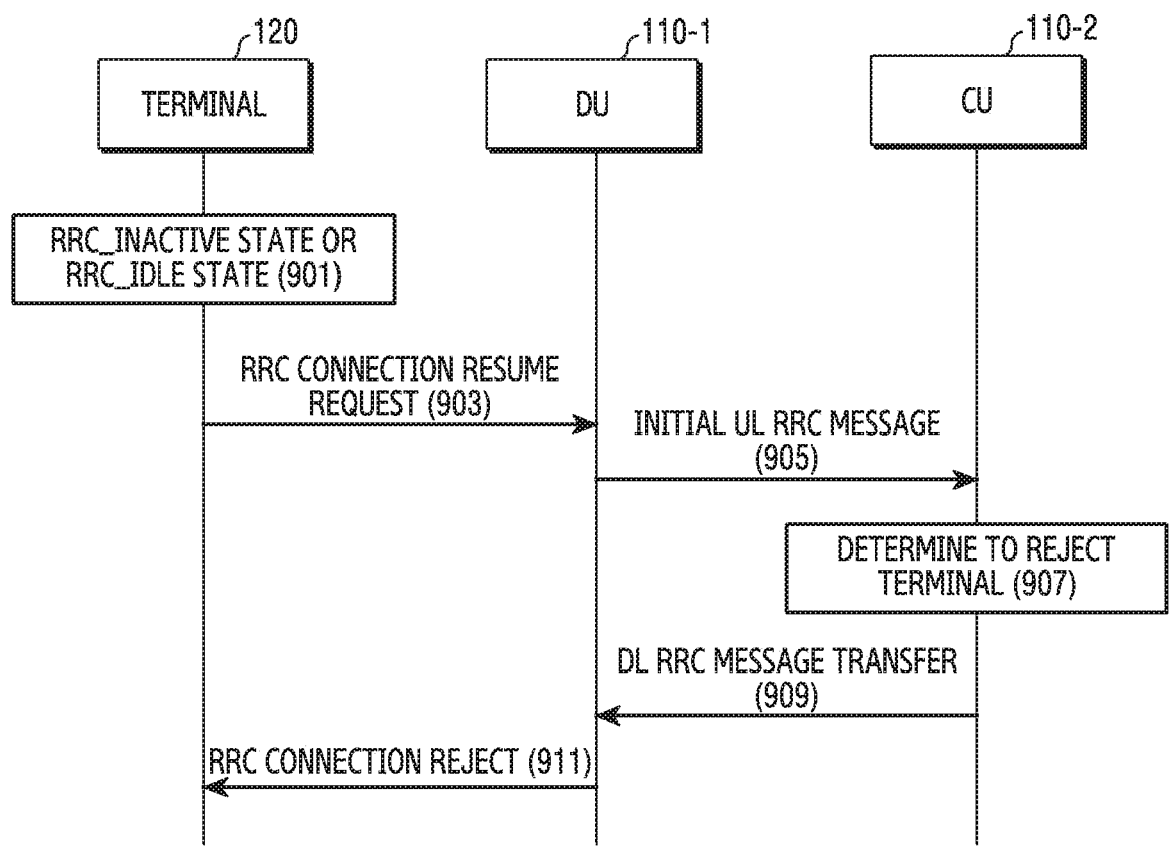
FIG. 9 illustrates a signal exchange diagram if an RRC state transition attempt is rejected in a wireless communication system according to various embodiments of the present disclosure.

FIG. 9 illustrates a signal exchange diagram if an RRC state transition attempt is rejected in a wireless communication system according to various embodiments of the present disclosure. FIG. 9 illustrates signal exchanges between the terminal 120, the distributed unit 110-1 of the base station 110, and the central unit 110-2 of the base station 110.

Referring to FIG. 9, in step 901, the terminal 120 operates in the RRC inactive state or the RRC idle state. Next, in step 903, the terminal 120 transmits an RRC connection resume request message. That is, according to event occurrence such as generating data to transmit, the terminal 120 transmits a message requesting transition to the RRC connected state. In step 905, the distributed unit 110-1 transmits an initial uplink RRC message to the central unit 110-2. The initial uplink RRC message includes the RRC connection resume request message transmitted from the terminal 120, and additionally, may further include at least one of identification information (e.g., C-RNTI) of the terminal 120 and resource allocation configuration information of the distributed unit 110-1.

In step 907, the central unit 110-2 determines to reject the request of the terminal 120. The request may be rejected for various causes. For example, the central unit 110-2 may reject the request of the terminal 120 according to the lack of resources due to congestion. Hence, in step 909, the central unit 110-2 transmits a downlink RRC message transfer message. For example, the downlink RRC message transfer message may include an RRC message indicating the rejection for the RRC connection resume. In step 911, the distributed unit 110-1 transmits an RRC connection reject message.

In the above example, the request of the state transition was rejected by the central unit. However, since the base station has the structure divided into the central unit and the distributed unit, the failure of the state transition may be determined by the distributed unit. In other words, the distributed unit may determine whether to accept the request (e.g., the state transition request) of the terminal. This operation may be referred to as 'connection control', 'resource allocation control', 'resource management', 'resource control', 'admission control', and so on.

Since the central unit is higher than the distributed unit, if the central unit determines the rejection, it may conduct the procedure by notifying the determined rejection case. However, if the distributed unit determines the rejection, it may be impossible to process the state transition failure case merely using an existing message or information element (IE), or additional message exchange may be required though the failure case is processed with the existing message. Thus, avoid such inefficiency, a procedure is required to notify the rejection case from the distributed unit to the central unit.

In other words, unlike a conventional base station which is a single object, in a base station structure including two objects such as the central unit and the distributed unit, not only the central unit but also the distributed unit may determine the connection rejection. Hence, the present disclosure provides a method for, if the distributed unit determines the connection rejection, notifying the connection rejection case of the distributed unit to the central unit which is the object separated from the distributed unit.

Figure 10:
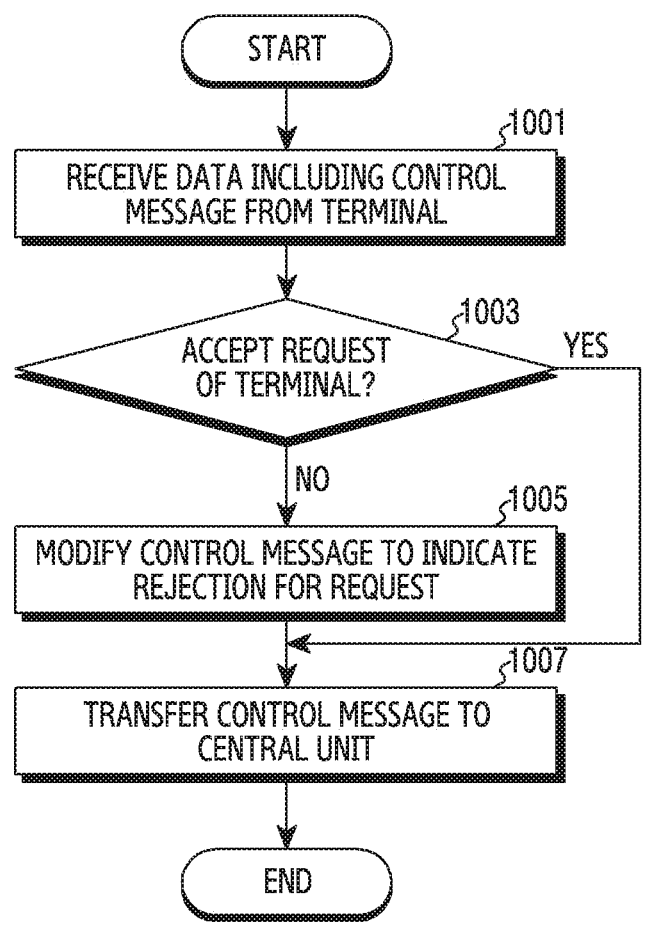
FIG. 10 illustrates a flowchart for rejecting state transition before control message transfer of a distributed unit of a base station in a wireless communication system according to various embodiments of the present disclosure.

FIG. 10 illustrates a flowchart for rejecting a transition before control message transfer of a distributed unit of a base station in a wireless communication system according to various embodiments of the present disclosure. FIG. 10 illustrates an operating method of the distributed unit 110-1.

Referring to FIG. 10, in step 1001, the distributed unit receives data including a control message from the terminal. At this time, the distributed unit may receive lower layer data (e.g., MAC packet data unit (PDU)) including a control message of an upper layer not processed by the distributed unit. In other words, the distributed unit may receive the control message of the upper layer processed by the central unit. Herein, the control message may be a message of the RRC layer. Further, the control message may be a message requesting state transition of the terminal. Specifically, the control message may be a message requesting transition from the RRC inactive state to the RRC connected state.

In step 1003, the distributed unit determines whether to accept the request of the terminal. In other words, the distributed unit determines whether to accept a procedure (e.g., state transition, connection setup, etc.) requested by the terminal. For example, the distributed unit may determine whether to accept the terminal based on available status of available hardware resources (e.g., a buffer, etc.), logical resources (e.g., the maximum number of users to accept), and physical resources (e.g., time resources, frequency resources, etc.). That is, regardless of the layer (e.g., the RRC layer) where the control message is processed, the distributed unit may determine whether to accept the terminal based on the status of the layers managed by the distributed unit.

If determining not to accept the request of the terminal, the distributed unit modifies the control message to indicate rejection for the request of the terminal, in step 1005. In other words, the distributed unit modifies the control message to indicate that it rejects the procedure requested by the control message. According to an embodiment, the distributed unit may insert a reject indication into the control message. For example, the distributed unit may insert the reject indication by adding, replacing or removing at least one bit having a particular value at a particular position in the control message. As another example, the distributed unit may represent the reject indication, by removing or replacing a specific information element with another value in the control message. That is, according to various embodiments, inserting the reject indication may be understood to embrace not only adding at least one bit, but also replacing or deleting it.

In step 1007, the distributed unit transfers the control message to the central unit. For doing so, the distributed unit may generate a transfer message including the modified control message, and transmit the transfer message via an interface between the distributed unit and the central unit.

In the embodiment described with reference to FIG. 10, the distributed unit determines whether to accept the request of the terminal. Various operations may be performed to determine whether to accept the request of the terminal. In other words, specific embodiments for determining whether to accept the request of the terminal may be variously defined. The specific embodiments for determining whether to accept the request of the terminal may be variously defined depending which information is based on or what kind of determination is conducted.

According to an embodiment, to determine whether to accept the request of the terminal, the distributed unit may perform in advance an operation performed after receiving the request for context setup from the central unit, before receiving the request for the context setup. For example, before receiving the request for the context setup, the distributed unit may attempt to reserve/allocate resources of the MAC/PHY layer for a signaling radio bearer (SRB) to transmit a control message. Together with the resource reservation/allocation of the MAC/PHY layer, determining whether to accept the request of the terminal may be performed. Specifically, if the resource allocation for the signaling radio bearer is successful, the distributed unit may determine to accept the request for the terminal, and if the resource allocation for the signaling radio bearer fails, the distributed unit may determine not to accept the request for the terminal. If the resource reservation/allocation operation of the MAC/PHY layer is performed in advance, if the state transition is successful as shown in FIG. 7 or FIG. 8, after the request for the context setup is received (e.g., after step 709 or after step 809), the operation for the resource reservation/allocation of the MAC/PHY layer may be omitted.

Herein, the signaling radio bearer considered in the resource reservation/allocation of the MAC/PHY layer may include a signaling radio bearer (e.g., SRB1) for a dedicated control channel (DCCH). In this case, the resource reservation/allocation of the MAC/PHY layer for transmitting the control message may include a MAC/PHY resource allocation operation for SRB1 for transferring parameters (e.g., channel quality information (CQI), sounding reference signal (SRS) reporting, etc.) used by the terminal in transmitting an RRC connection setup complete message through the SRB1 to the central unit.

Figure 11:
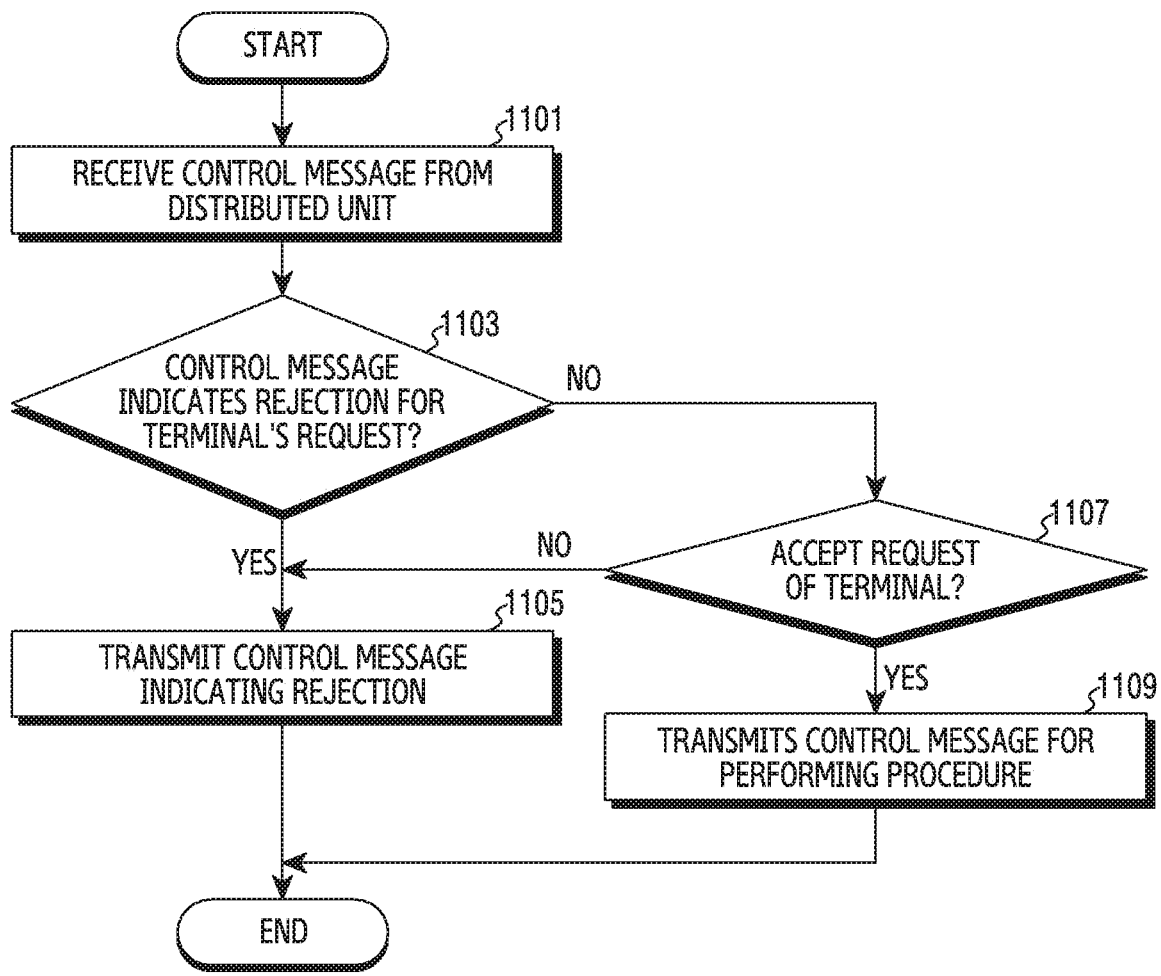
FIG. 11 illustrates a flowchart of a central unit of a base station in a wireless communication system according to various embodiments of the present disclosure.

FIG. 11 illustrates a flowchart of a central unit of a base station in a wireless communication system according to various embodiments of the present disclosure. FIG. 11 illustrates an operating method of the central unit 110-2.

Referring to FIG. 11, in step 1101, the central unit receives a control message from the distributed unit. In other words, the central unit receives the control message generated by the terminal from the distributed unit. Specifically, the central unit receives a transfer message including the control message, and identifies the control message in the transfer message. Herein, the control message may be a message of the RRC layer. Further, the control message may be a message requesting state transition of the terminal. For example, the control message may be a message requesting transition from the RRC inactive state to the RRC connected state.

In step 1103, the central unit identifies whether the control message indicates rejection for the terminal's request. In other words, the central unit determines whether the control message indicates the rejection of the distributed unit. According to an embodiment, the central unit may determine whether the control message indicates the rejection, by identifying whether a reject indication is inserted in the control message. For example, the central unit may identify whether at least one bit having a particular value at a particular position in the control message is added, replaced, or removed. As another example, the central unit may determine whether a particular information element in the control message is removed or replaced by another value. That is, according to various embodiments, inserting the reject indication may be understood to embrace not only adding at least one bit, but also replacing or deleting it.

If the control message indicates the rejection for the terminal's request, the central unit transmit a control message for the rejection, in step 1105. That is, the central unit determines connection setup of the terminal, that is, to reject the state transition, according to the determination of the distributed unit, and generates and transmits a control message for notifying this to the terminal. Specifically, the central unit may generate a control message notifying the rejection, generate a transfer message including the control message, and then transmit the transfer message to the distributed unit.

If the control message does not indicate the rejection for the request of the terminal, the central unit determines whether to accept the request of the terminal, in operation 1107. The central unit may determine the acceptability based on the status of the layers managed by the central unit. For example, the central unit may determine the acceptability based on whether context of the terminal is stored, and the resource status of the corresponding layers. If not accepting the request of the terminal, the central unit proceeds to step 1105.

By contrast, if accepting the request of the terminal, in step 1109, the central unit transmits a control message for performing a procedure according to the request. For example, if the terminal requests the state transition, the central unit may generate a control message indicating the state transition, generate a transfer message including the control message, and then transmit the transfer message to the distributed unit. For example, the message indicating the state transition may include a message instructing to set the context or a message instructing to establish an RRC connection.

According to the embodiments described with reference to FIG. 10 and FIG. 11, the rejection for the request of the terminal determined by the distributed unit may be transferred to the central unit. Thus, meaningless signaling for an unnecessary state transition attempt may reduce.

Also, as described above, the reject indication may be defined in various forms. The reject indication which is the information element for informing the central unit of the rejection case is not limited to its name, and any parameter for informing the central unit of the rejection case is sufficient. In addition, it is possible to notify the rejection case, by intentionally omitting and transmitting the corresponding information element. For example, the transfer message (e.g., an initial uplink RRC transfer message) including the reject indication may include at least one of information elements shown in Table 1.

TABLE 1

| IE | Description |
|---|---|
| DU UE ID | Unique identifier for UE over the F1 interface within a DU |
| PCI | Physical Cell Identifier |
| C-RNTI | Cell-RNTI(Radio Network Temporary Identifier) |
| RRC Container | RRC message container which is delivered to CU |
| Reject Indication | Indicator that DU rejected allocating radio resource |

TABLE 1-continued

FIG. 10 and FIG. 11 illustrate the case where the control message for the state transition is received, but a control message for another purpose may be received. Thus, according to another embodiment, the distributed node may further perform an operation of classifying the control message. That is, if receiving a control message, the distributed node may determine whether it is signaling requiring resource allocation such as state transition, and perform the above-mentioned operations in response to the signaling requiring the resource allocation. For example, the distributed node may classify the control message, by examining a bit pattern of a specific position in the control message. According to yet another embodiment, the distributed node may perform an operation related to the reject indication for all control messages without classifying the message, and the central node may selectively use the reject indication.

The operations related to the reject indication as mentioned above may be applied to various procedures. For example, if an RRC connection resume request message is received and the distributed unit determines to reject the RRC connection resume prior to transmitting an initial uplink RRC message transfer message, the aforementioned reject indication may be used to notify the central unit of the RRC connection resume request rejected by the distributed unit. By defining the reject indication, if the distributed unit which is a lower object determines to reject, additional signaling for an operation to share information to the central unit which a higher object may be prevented and procedure latency may be minimized. An example in which the reject indication is used in the RRC connection resume procedure is described with reference to FIG. 12A, FIG. 12B, FIG. 13A, and FIG. 13B.

Figure 12A:
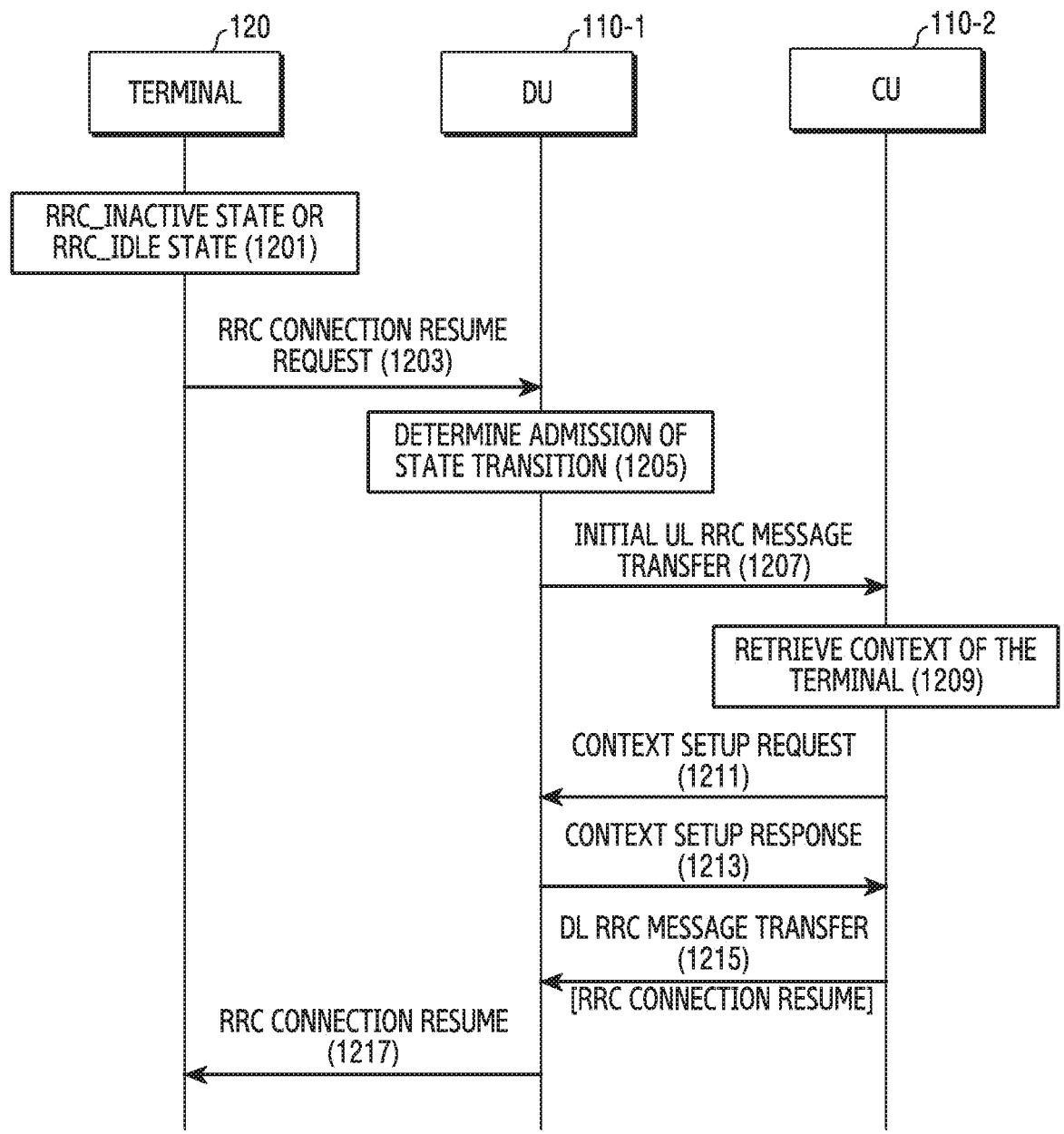
FIG. 12A illustrates a signal exchange diagram if a state transition attempt using an RRC resume procedure is successful in a wireless communication system according to various embodiments of the present disclosure.

FIG. 12A illustrates a signal exchange diagram if a state transition attempt using an RRC resume procedure is successful in a wireless communication system according to various embodiments of the present disclosure. FIG. 12A illustrates signal exchanges between the terminal 120, the distributed unit 110-1 of the base station 110, and the central unit 110-2 of the base station 110.

Referring to FIG. 12A, in step 1201, the terminal 120 operates in the RRC inactive state or the RRC idle state. Next, in step 1203, the terminal 120 transmits an RRC connection resume request message. That is, according to event occurrence such as generating data to transmit, the terminal 120 transmits a message requesting transition to the RRC connected state.

In step 1205, the distributed unit 110-1 determines admission of the state transition of the terminal 120. For example, the distributed unit 110-1 tries to resource allocation of the MAC/PHY layer for a signaling radio bearer to transmit a control message, and determines success of the resource allocation. In step 1207, the distributed unit 110-1 transmits an initial uplink RRC message including the RRC connection resume request message to the central unit 110-2.

In step 1209, the central unit 110-2 retrieves context of the terminal 120. FIG. 12A illustrates a case where the context of the terminal 120 is stored in the central unit 110-2. Accordingly, the central unit 110-2 may obtain the context of the terminal 120. That is, the central unit 110-2 may successfully retrieve the context of the UE 120 and determine to resume a data radio bearer (DRB).

Next, in step 1211, the central unit 110-2 transmits a UE context setup request message to the distributed unit 110-1. Specifically, as obtaining the context of the terminal 120, the central unit 110-2 may allocate a UE F1-AP IE for the terminal 120, and transmit a message requesting context setup. As the context setup is requested from the central unit 110-2, the distributed unit 110-1 sets the context of the terminal 120. Next, in step 1213, the distributed unit 110-1 transmits a UE context setup response message.

Next, in step 1215, the central unit 110-2 transmits a downlink RRC message transfer message including an RRC connection resume message. In step 1217, the distributed unit 110-1 transmits the RRC connection resume message. Next, operations for the terminal 120 to transit to the RRC connected state are performed. For example, although not depicted in FIG. 12A, the terminal 120 may transmit an RRC connection resume complete message to the distributed unit 110-1, and the distributed unit 110-1 may transmit an uplink RRC message transfer message including the RRC connection resume complete message to the central unit 110-2. Thus, the terminal 120 may transit to the RRC connected state.

Figure 12B:
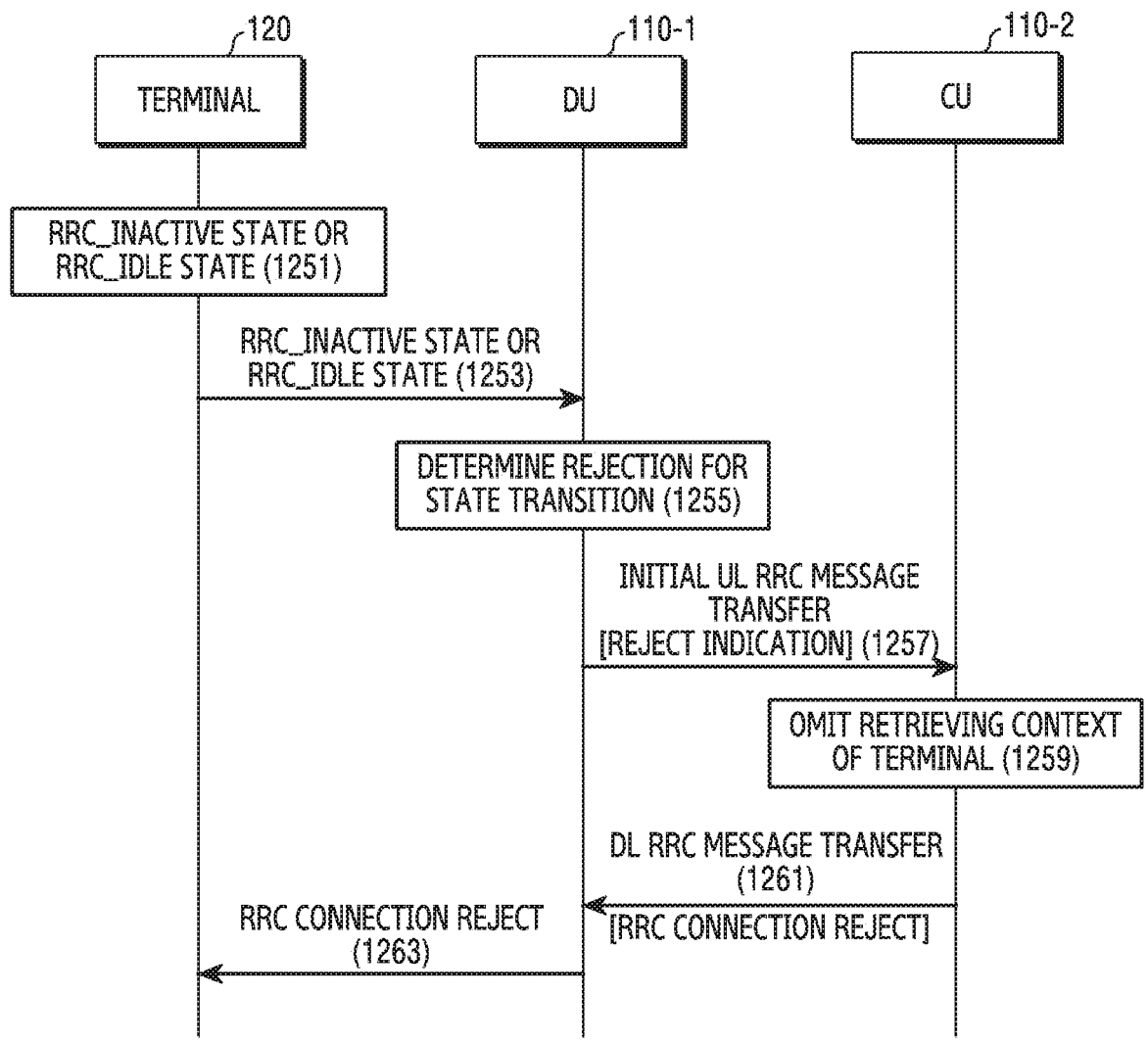
FIG. 12B illustrates a signal exchange diagram if the state transition attempt using the RRC resume procedure is rejected by a distributed unit before control message transfer in the wireless communication system according to various embodiments of the present disclosure.

FIG. 12B illustrates a signal exchange diagram if the state transition attempt using the RRC resume procedure is rejected by the distributed unit before the control message transfer in the wireless communication system according to various embodiments of the present disclosure. FIG. 12A illustrates signal exchanges between the terminal 120, the distributed unit 110-1 of the base station 110, and the central unit 110-2 of the base station 110.

Referring to FIG. 12B, in step 1251, the terminal 120 operates in the RRC inactive state or the RRC idle state. Next, in step 1253, the terminal 120 transmits an RRC connection resume request message. That is, according to event occurrence such as generating data to transmit, the terminal 120 transmits a message requesting transition to the RRC connected state.

In step 1255, the distributed unit 110-1 determines rejection for the state transition of the terminal 120. For example, the distributed unit 110-1 attempts resource allocation of the MAC/PHY layer for a signaling radio bearer to transmit a control message, and determines failure of the resource allocation. In step 1257, the distributed unit 110-1 transmits an initial uplink RRC message including a reject indication to the central unit 110-2. That is, if the distributed unit 110-1 determines the RRC connection resume rejection prior to the transmission of the initial uplink RRC message, the distributed unit 110-1 includes the reject indication in the initial uplink RRC message to notify the rejection case to the central unit 110-2.

In step 1259, the central unit 110-2 omits the retrieve operation for the context of the terminal 120. That is, upon identifying the reject indication, the central unit 110-2 determines that the terminal 120 rejects the state transition request without further determination. Hence, in step 1261, the central unit 110-2 transmits a final downlink RRC message transfer message including an RRC connection reject message. That is, the central unit 110-2 receiving the initial uplink RRC message including the reject indication does not perform a new context allocation operation, and directly transmits the downlink RRC message transfer message including the RRC connection resume reject message or the RRC connection reject message to the distributed unit 110-1.

In step 1263, the distributed unit 110-1 transmits the RRC connection reject message to the terminal 120. The distributed unit 110-1 receiving the downlink RRC message transfer message including the RRC connection resume reject message or the RRC connection reject message transfers the RRC message to the terminal 120. Accordingly, the terminal 120 is finally notified of the failure of the state transition operation to the RRC connected state.

Figure 13A:
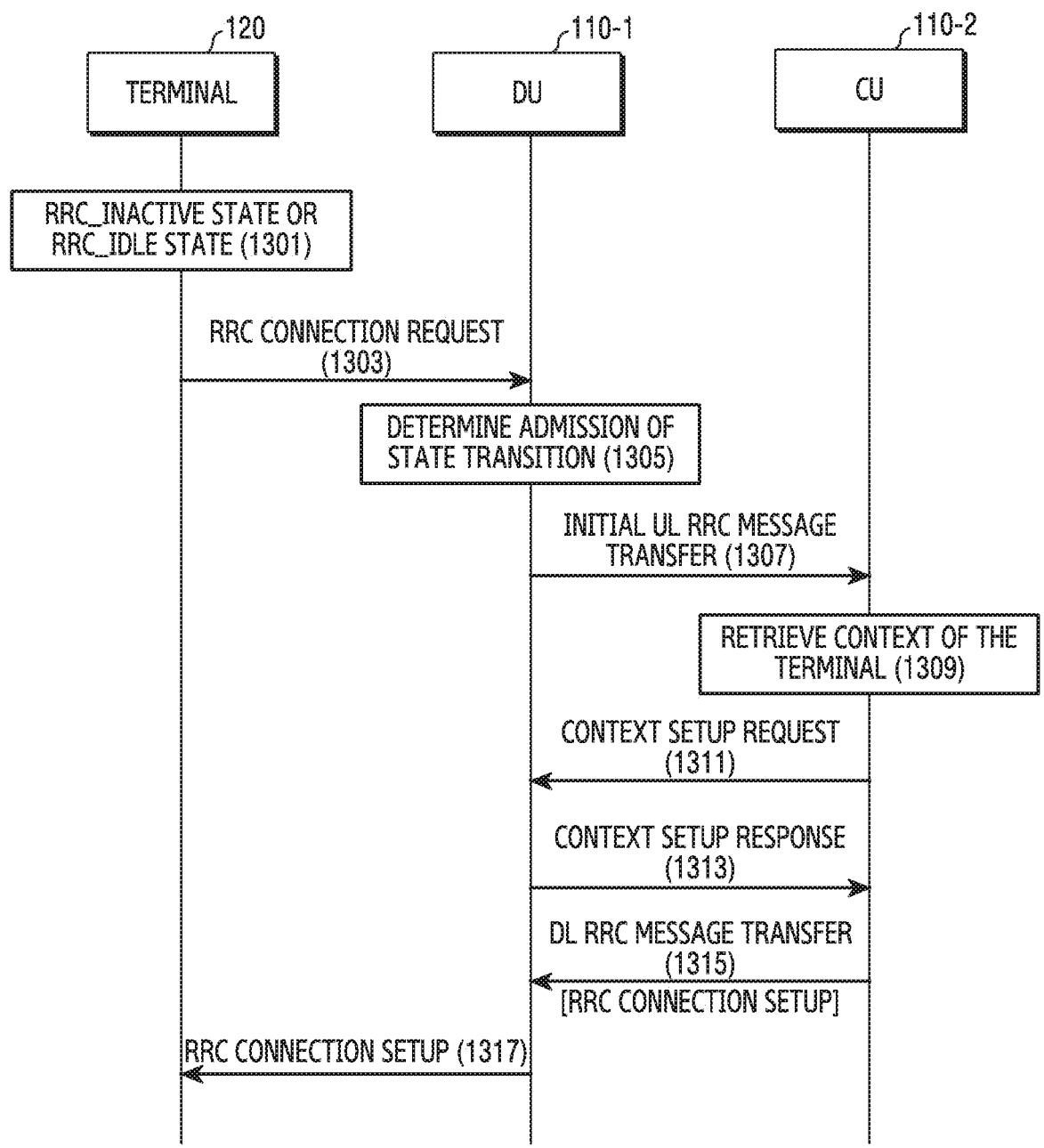
FIG. 13A illustrates a signal exchange diagram if a state transition attempt using an RRC connection procedure is successful in a wireless communication system according to various embodiments of the present disclosure.

FIG. 13A illustrates a signal exchange diagram if a state transition attempt using an RRC connection procedure is successful in a wireless communication system according to various embodiments of the present disclosure. FIG. 13A illustrates signal exchanges between the terminal 130, the distributed unit 110-1 of the base station 110, and the central unit 110-2 of the base station 110.

Referring to FIG. 13A, in step 1301, the terminal 130 operates in the RRC inactive state or the RRC idle state. Next, in step 1303, the terminal 130 transmits an RRC connection request message. That is, according to event occurrence such as generating data to transmit, the terminal 130 transmits a message requesting transition to the RRC connected state.

In step 1305, the distributed unit 110-1 determines admission for the state transition of the terminal 130. For example, the distributed unit 110-1 tries to resource allocation of the MAC/PHY layer for a signaling radio bearer to transmit a control message, and determines success of the resource allocation. In step 1307, the distributed unit 110-1 transmits an initial uplink RRC message including the RRC connection resume request message to the central unit 110-2.

In step 1309, the central unit 110-2 retrieves context of the terminal 130. FIG. 13A illustrates a case where the context of the terminal 130 is stored in the central unit 110-2. Accordingly, the central unit 110-2 may obtain the context of the terminal 130. That is, the central unit 110-2 may successfully retrieve the context of the UE 130 and determine to connect a DRB.

Next, in step 1311, the central unit 110-2 transmits a UE context setup request message to the distributed unit 110-1. Specifically, as obtaining the context of the terminal 130, the central unit 110-2 may allocate a UE F1-AP IE for the terminal 130, and transmit a message requesting context setup. As the context setup is requested from the central unit 110-2, the distributed unit 110-1 sets the context of the terminal 130. Next, in step 1313, the distributed unit 110-1 transmits a UE context setup response message.

Next, in step 1315, the central unit 110-2 transmits a downlink RRC message transfer message including an RRC connection setup message. In step 1317, the distributed unit 110-1 transmits the RRC connection message. Next, operations for the terminal 130 to transit to the RRC connected state are performed. For example, although not depicted in FIG. 13A, the terminal 130 may transmit an RRC connection setup complete message to the distributed unit 110-1, and the distributed unit 110-1 may transmit an uplink RRC message transfer message including the RRC connection complete message to the central unit 110-2. Thus, the terminal 130 may transit to the RRC connected state.

Figure 13B:
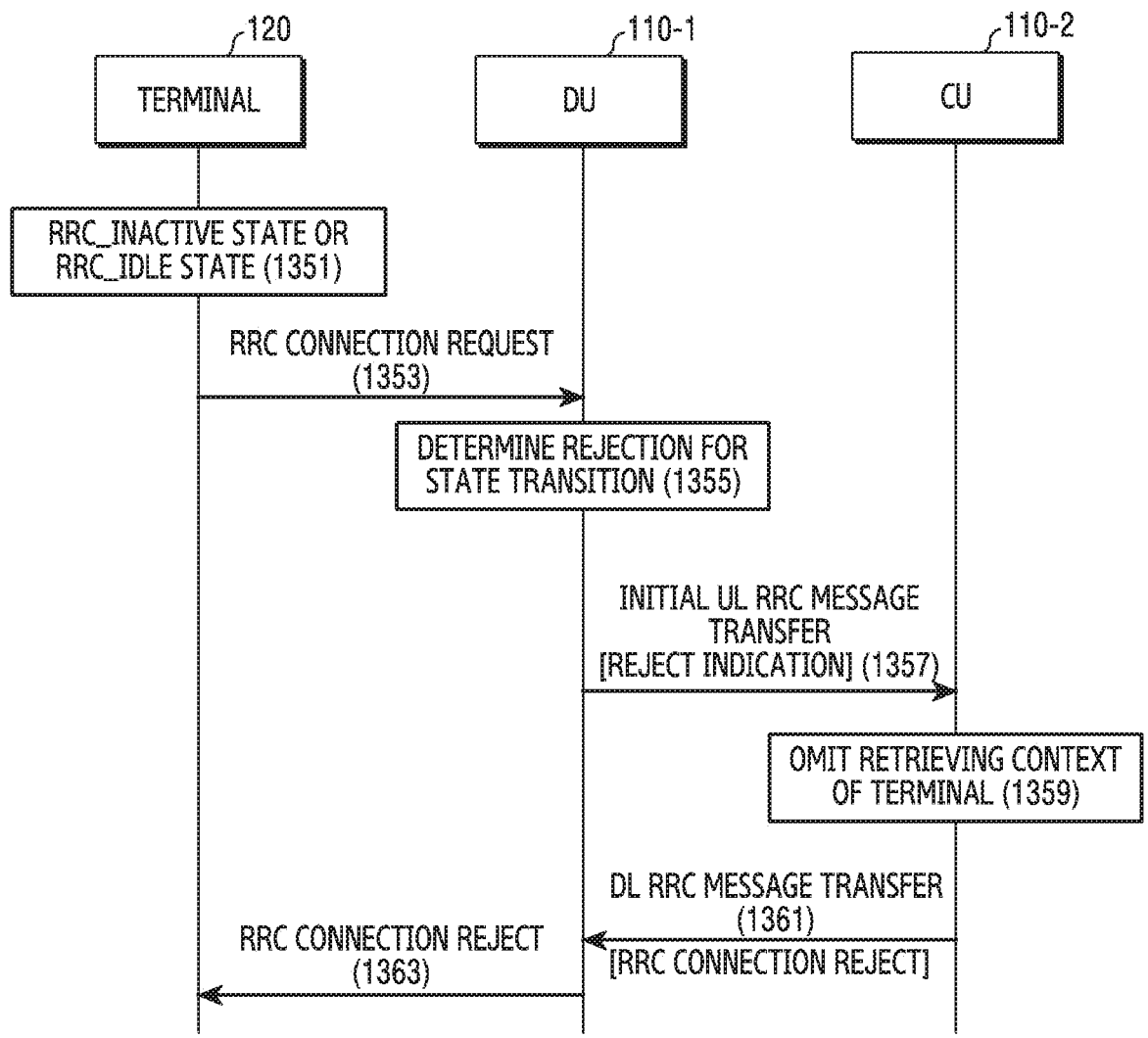
FIG. 13B illustrates a signal exchange diagram if the state transition attempt using the RRC connection procedure is rejected by a distributed unit before control message transfer in the wireless communication system according to various embodiments of the present disclosure.

FIG. 13B illustrates a signal exchange diagram if the state transition attempt using the RRC connection procedure is rejected by the distributed unit before the control message transfer in the wireless communication system according to various embodiments of the present disclosure. FIG. 13A illustrates signal exchanges between the terminal 130, the distributed unit 110-1 of the base station 110, and the central unit 110-2 of the base station 110.

Referring to FIG. 13B, in step 1351, the terminal 120 operates in the RRC inactive state or the RRC idle state. Next, in step 1353, the terminal 120 transmits an RRC connection request message. That is, according to event occurrence such as generating data to transmit, the terminal 120 transmits a message requesting transition to the RRC connected state.

In step 1355, the distributed unit 110-1 determines rejection for the state transition of the terminal 120. For example, the distributed unit 110-1 attempts resource allocation of the MAC/PHY layer for a signaling radio bearer to transmit a control message, and determines failure of the resource allocation. In step 1357, the distributed unit 110-1 transmits an initial uplink RRC message including a reject indication to the central unit 110-2. That is, if the distributed unit 110-1 determines the RRC connection reject prior to the transmission of the initial uplink RRC message, the distributed unit 110-1 includes the reject indication in the initial uplink RRC message to notify the rejection case to the central unit 110-2.

In step 1359, the central unit 110-2 omits the retrieve operation for the context of the terminal 120. That is, upon identifying the reject indication, the central unit 110-2 determines that the terminal 120 rejects the state transition request without further determination. Hence, in step 1361, the central unit 110-2 transmits a final downlink RRC message transfer message including an RRC connection reject message. That is, the central unit 110-2 receiving the initial uplink RRC message including the reject indication does not perform a new context allocation operation, and directly transmits the downlink RRC message transfer message including the RRC connection reject message to the distributed unit 110-1.

In step 1363, the distributed unit 110-1 transmits the RRC connection reject message to the terminal 120. The distributed unit 110-1 receiving the downlink RRC message transfer message including the RRC connection reject message transfers the RRC message to the terminal 120. Hence, the terminal 120 is finally notified of the failure of the state transition operation to the RRC connected state.

As stated above, the rejection state determined by the distributed unit may be transferred to the central unit using the reject indication. However, before the initial uplink RRC message transfer message is transmitted, whether to accept the terminal may not be determined. That is, after the initial uplink RRC message transfer message is transmitted, the rejection case may be determined by the distributed unit. In this case, since the reject indication is not included, if the terminal is not rejected by the central unit, the state transition procedure may proceed. In addition, if the admission rejection of the terminal is determined before the initial uplink RRC message transfer message is transmitted but the reject indication is omitted, the same case may occur. If the state transition procedure is proceeded by the determination latency of the rejection case or the omission of the reject indication, this means occurrence of inefficiency due to unnecessary signaling. Thus, the present disclosure provides a method for a case where the reject indication is not transmitted.

Figure 14:
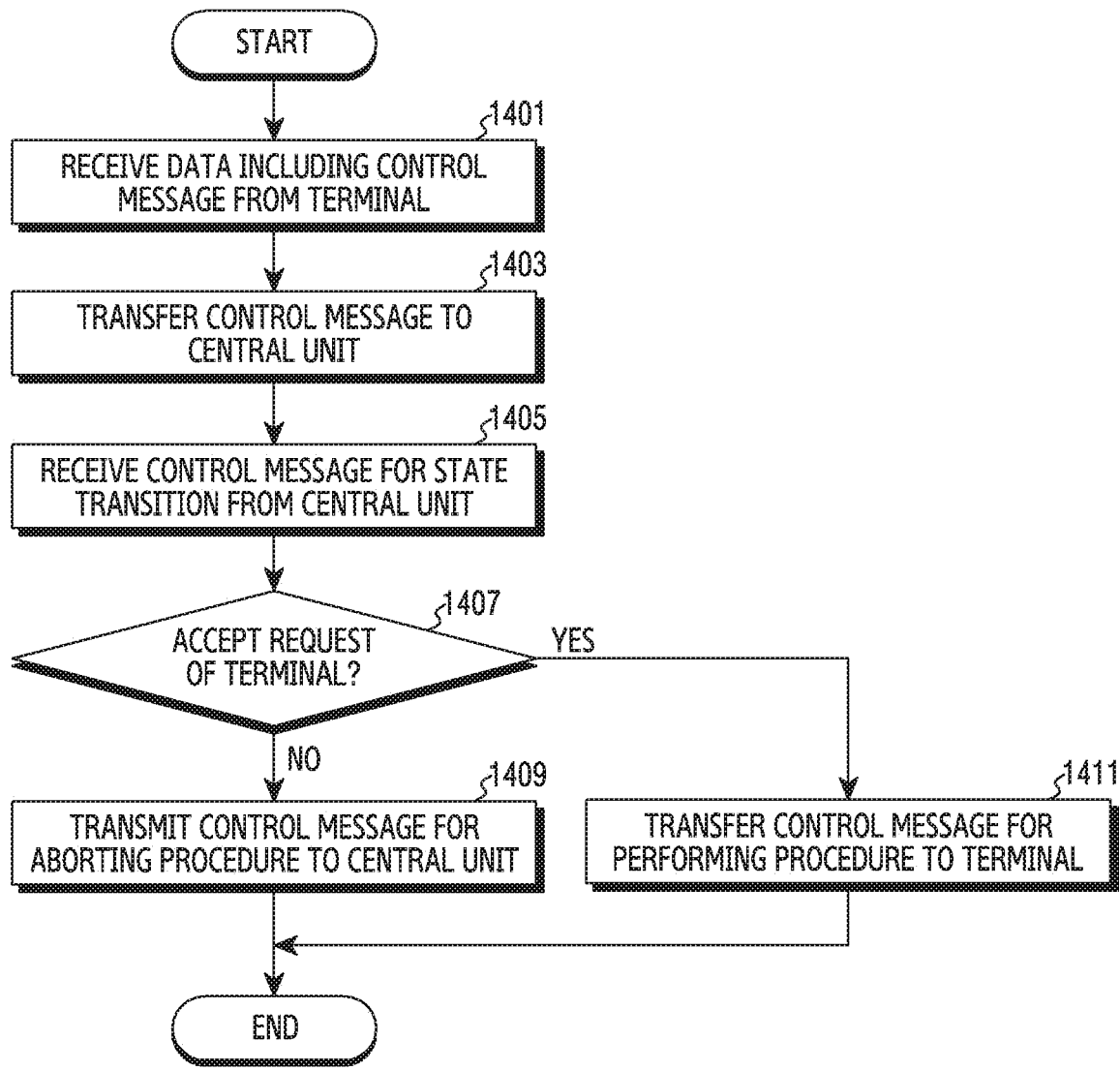
FIG. 14 illustrates a flowchart for rejecting state transition after control message transfer of a distributed unit of a base station in a wireless communication system according to various embodiments of the present disclosure.

FIG. 14 illustrates a flowchart for rejecting state transition after control message transfer of a distributed unit of a base station in a wireless communication system according to various embodiments of the present disclosure. FIG. 14 illustrates an operating method of the distributed unit 110-1.

Referring to FIG. 14, in step 1401, the distributed unit receives data including a control message from the terminal Herein, the control message may be a message of the RRC layer. Further, the control message may be a message requesting state transition of the terminal. For example, the control message may be a message requesting the transition from the RRC inactive state to the RRC connected state.

In step 1403, the distributed unit transfers the control message to the central unit. For doing so, the distributed unit may generate a transfer message including the control message, and transmit the transfer message via an interface between the distributed unit and the central unit.

In step 1405, the distributed unit receives a control message for the procedure from the central unit. If the procedure requested by the terminal is the state transition, the request for the state transition of the terminal is accepted by the central unit, and thus the distributed unit may receive a downlink RRC message transfer message including the control message for the state transition. For example, the control message may include a context setup request message or an RRC connection setup message.

In step 1407, the distributed unit determines whether to accept the request of the terminal. For example, the distributed unit may determine whether to accept the terminal based on available statuses of available hardware resources (e.g., a buffer, etc.), logical resources (e.g., the maximum number of users to accept), and physical resources (e.g., time resources, frequency resources, etc.). That is, regardless of the layer (e.g., the RRC layer) where the control message is processed, the distributed unit may determine whether to accept the request based on the status of the layers managed by the distributed unit. The operation of step 1407 may be understood as an operation for identifying the determination before step 1403 or a new determining operation.

If determining not to accept the request of the terminal, in step 1409, the distributed unit transmits a control message for aborting the procedure to the central unit. That is, the distributed unit does not transfer the control message to the terminal, but generates and transmits a control message corresponding to the rejection. Thus, the procedure (e.g., the state transition) requested by the terminal may be aborted.

If determining to accept the request of the terminal, the distributed unit transfers a control message for the procedure to the terminal, in step 1411. That is, the distributed unit may transmit the control message to the terminal, so that the procedure for the state transition is conducted.

As in the embodiment described with reference to FIG. 14, unnecessary procedure proceeding may be prevented though the reject indication is not used. In other words, even if the reject indication is omitted as shown in FIG. 14, the quick procedure termination may be achieved according to the determination of the DU. Herein, the omission of the reject indication may occur for various causes, for example, if the admission rejection is determined but an error occurs in the message modification, or if it takes a long time (e.g., a time limit for transmitting the control message) to determine whether to accept, or if a case for determining whether to accept is changed. An example of applying the procedure of FIG. 14 to the RRC connection resume procedure is described with reference to FIG. 15.

Figure 15:
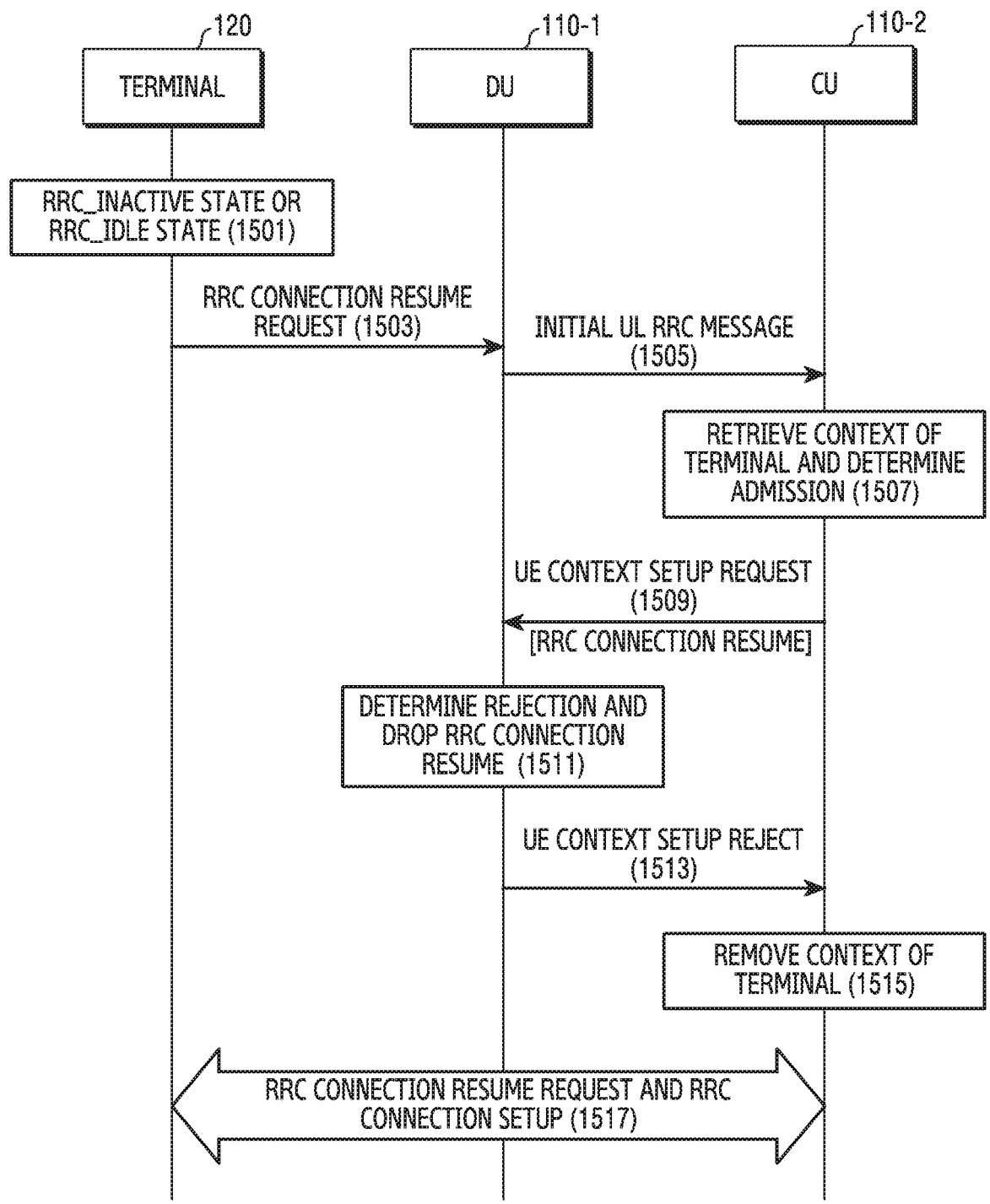
FIG. 15 illustrates a signal exchange diagram if an RRC state transition attempt is rejected by a distributed unit after control message transfer in a wireless communication system according to various embodiments of the present disclosure.

FIG. 15 illustrates a signal exchange diagram if an RRC state transition attempt is rejected by a distributed unit after control message transfer in a wireless communication system according to various embodiments of the present disclosure. FIG. 15 illustrates signal exchanges between the terminal 120, the distributed unit 110-1 of the base station 110, and the central unit 110-2 of the base station 110.

Referring to FIG. 15, in step 1501, the terminal 120 operates in the RRC inactive state or the RRC idle state. Next, in step 1503, the terminal 120 transmits an RRC connection resume request message. That is, according to event occurrence such as generating data to transmit, the terminal 120 transmits a message requesting transition to the RRC connected state.

In step 1503, the terminal 120 transmits an RRC connection resume request message. That is, according to event occurrence such as generating data to transmit, the terminal 120 transmits a message requesting transition to the RRC connected state.

In step 1505, the distributed unit 110-1 transmits an initial uplink RRC message transfer message to the central unit 110-2. The initial uplink RRC message transfer message includes the RRC connection resume request message transmitted from the terminal 120. In addition, the initial uplink RRC message may further include at least one of identification information (e.g., C-RNTI) of the terminal 120 and information relating to resource allocation configuration of the distributed unit 110-1.

In step 1507, the central unit 110-2 retrieves context of the terminal 120. FIG. 15 illustrates a case where the context of the terminal 120 is stored in the central unit 110-2. Accordingly, the central unit 110-2 may obtain the context of the terminal 120. That is, the central unit 110-2 may successfully retrieve the context of the UE 120, and determine to resume a data radio bearer.

In step 1509, the central unit 110-2 transmits a UE context setup request message including the RRC connection resume to the distributed unit 110-1. Specifically, upon obtaining the context of the terminal 120, the central unit 110-2 may allocate a UE F1-AP IE for the terminal 120, and transmit a message requesting the context setup.

In step 1511, the distributed unit 110-1 determines rejection for the terminal 120, and drops the RRC connection resume message. For example, this step may be a case in which the distributed unit 110-1 determines the rejection before step 1505 but the insertion of the reject indication is omitted, or a case in which the rejection for the terminal 120 is determined after step 1505. In other words, this step may be a case in which the distributed unit 110-1 determines to reject the RRC connection resume after transmitting the initial uplink RRC message transfer message or a case in which the distributed unit 110-1 determines the rejection before transmitting the initial uplink RRC message transfer message but the operation of adding the reject indication to the initial uplink RRC message transfer message is omitted. Hence, the distributed unit 110-1 does not transfer the RRC connection resume message to the terminal 120, but drops it.

In step 1513, the distributed unit 110-1 transmits a UE context setup reject message. For example, the distributed unit 110-1 may generate the UE context setup reject message and transmit an uplink RRC message transfer message including the UE context setup reject message. If the distributed unit which is the lower object determines the rejection after transmitting the initial uplink RRC message, or determines before transmitting the initial uplink RRC message but the reject indication is omitted, the distributed unit 110-1, which receives the downlink RRC transfer message including the RRC connection resume message, may perform the rejection operation by the distributed unit 110-1 for the RRC connection resume request, by transmitting the UE context setup reject message to the central unit 110-2.

In step 1515, the central unit 110-2 removes the context of the terminal 120. That is, the central unit 110-2 terminates the state transition procedure of the terminal 120. Next, in step 1517, the state transition procedure of the terminal 120 may be performed again.

As in the various embodiments described above, in the state transition procedure, the procedure may be terminated quickly by the rejection determination of the distributed unit. The above-described embodiments illustrate the RRC connection resume procedure, but the above-described embodiments may be also applied to an initial access procedure and an RRC reestablishment procedure. Embodiments relating to the RRC reestablishment procedure will be described with reference to FIG. 16 and FIG. 17, embodiments relating to the RRC resume procedure will be described with reference to FIG. 18 and FIG. 19, and embodiments relating to the initial access procedure will be described with reference to FIG. 20 and FIG. 21.

Figure 16:
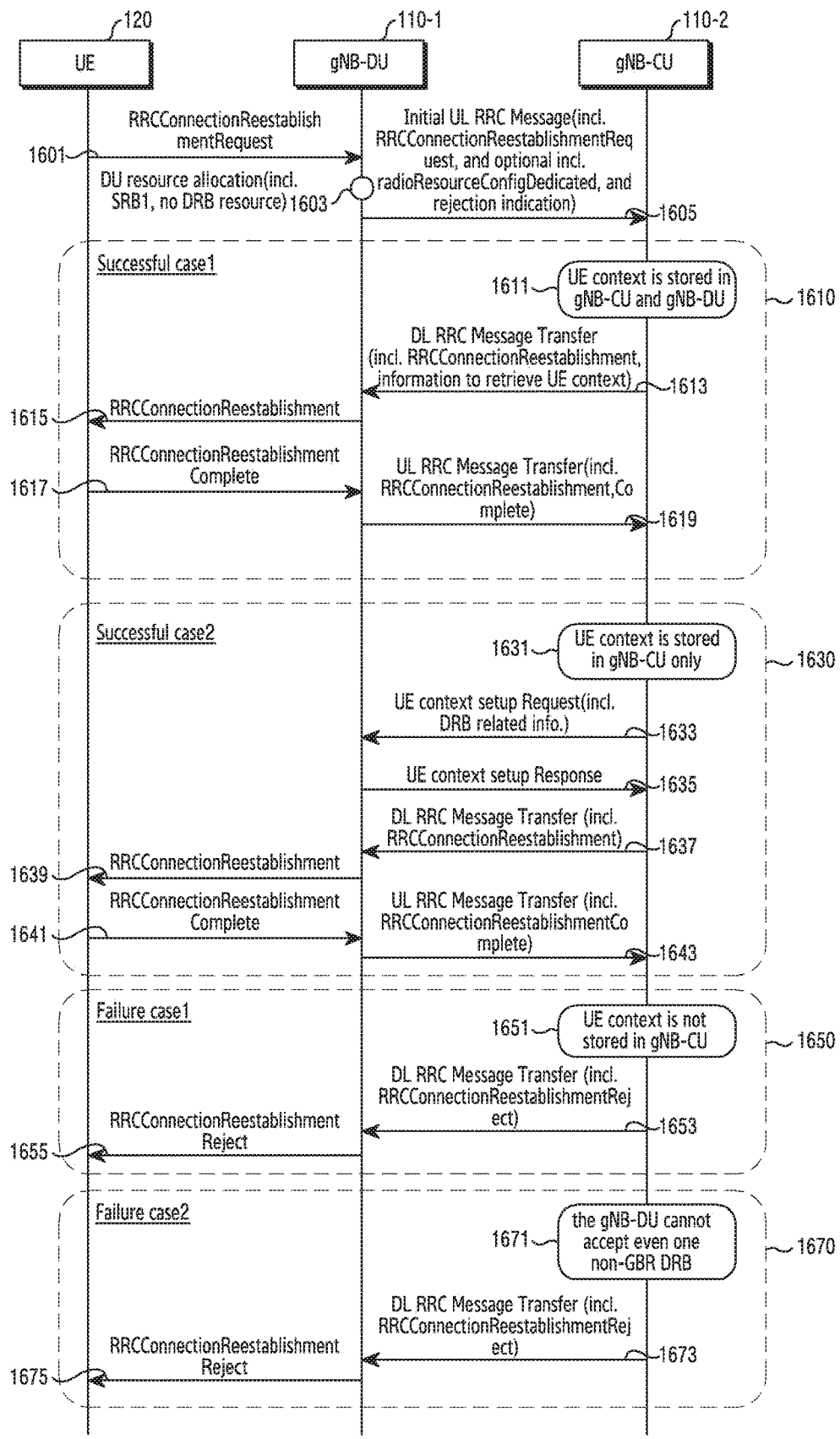
FIG. 16 illustrates a signal exchange diagram for an RRC reestablishment procedure in a wireless communication system according to various embodiments of the present disclosure.

FIG. 16 illustrates a signal exchange diagram for an RRC reestablishment procedure in a wireless communication system according to various embodiments of the present disclosure.

Referring to FIG. 16, in step 1601, the terminal 120 transmits an RRC connection reestablishment request message for transition to the RRC connected state. In step 1603, the distributed unit 110-1 allocates resources. Herein, the resources may include a signaling radio bearer. In step 1605, the distributed unit 110-1 transmits an initial uplink RRC message. That is, the distributed unit 110-1 includes and transfers a corresponding RRC message (e.g., the RRC connection reestablishment request message) in a non-UE related F1-AP initial uplink RRC message transfer message. In addition, the initial uplink RRC message transfer message may include C-RNTI of the UE 120, and may further include at least one of information relating to resource allocation configuration (e.g. radio Resource Config Dedicated) and a reject indication. Next, the procedure divides into a first successful case 1610, a second successful case 1630, a first failure case 1650, and a second failure state 1670.

According to the first successful case 1610, in step 1611, the central unit 110-2 successfully retrieves UE context stored in the distributed unit 110-1 and the central unit 110-2. Hence, the central unit 110-2 may assign a CU UE F1AP identifier (ID) for the terminal 120. Next, in step 1613, the central unit 110-2 transmits a downlink RRC message transfer message including an RRC connection reestablishment message. That is, the RRC connection reestablishment message is encapsulated in the downlink RRC message transfer message. Additionally, the downlink RRC message transfer message may further include information (e.g., previous CU UE F1AP ID, previous DU UE F1AP ID) for retrieving the UE context. In step 1615, the distributed unit 110-1 retrieves the UE context according to the information received in step 1613, and transmits the RRC connection reestablishment message. In step 1617, the terminal 120 transmits an RRC connection reestablishment complete message to the distributed unit 110-1. In step 1619, the distributed unit 110-1 encapsulates the RRC message, that is, the RRC connection reestablishment complete message, in the F1-AP uplink RRC message transfer message, and transmits the uplink RRC message transfer message to the central unit 110-2.

According to the second successful case 1630, in step 1631, the central unit 110-2 successfully retrieves the UE context stored in the central unit 110-2. That is, the second successful case 1630 is an example corresponding to the case where the UE context is not stored in the distributed unit 110-1. In step 1633, the central unit 110-2 transmits a UE context setup request message including data radio bearer related information. In step 1635, the distributed unit 110-1 transmits a UE context setup response message. In step 1637, the central unit 110-2 transmits a downlink RRC message transfer message including an RRC connection reestablishment message. In step 1639, the distributed unit 110-1 transmits the RRC connection reestablishment message. In step 1641, the terminal 120 transmits an RRC connection reestablishment complete message. In step 1643, the distributed unit 110-1 encapsulates the RRC message, that is, the RRC connection reestablishment complete message, in the F1-AP uplink RRC message transfer message, and transmits the uplink RRC message transfer message to the central unit 110-2.

According to the first failure case 1650, in step 1651, since the UE context is not stored in the central unit 110-2, the central unit 110-2 fails to retrieve the UE context. In step 1653, the central unit 110-2 transmits a downlink RRC message transfer message including an RRC connection reestablishment reject message. In step 1655, the distributed unit 110-1 transmits the RRC connection reestablishment reject message to the terminal 120.

According to the second failure case 1670, in step 1671, since the distributed unit 110-1 has determined not to accept one non-guaranteed bit rate (GBR) data radio bearer, the central unit 110-2 determines to reject the state transition. That is, the second failure case 1670 an example corresponding to a case where the reject indication is included in the initial uplink RRC message transfer message transmitted in step 1605. That is, the second failure case 1670 is the case where the distributed unit 110-1 determines the RRC connection reject before transmitting the initial uplink RRC message transfer message, and the distributed unit 110-1 includes the reject indication in the initial uplink RRC message transfer message to notify the rejection case. In step 1673, the central unit 110-2 transmits a downlink RRC message transfer message including the RRC connection reestablishment reject message. In other words, the central unit 110-2 receiving the initial uplink RRC message transfer message including the reject indication does not perform a new UE context assignment operation and directly transmits a downlink RRC message transfer message including the RRC connection reject message. In step 1675, the distributed unit 110-1 transmits the RRC connection reestablishment reject message to the terminal 120. That is, the distributed unit 110-1 receiving the downlink RRC message transfer message including the RRC connection reject message transfers the corresponding RRC message to the terminal 120, so that the terminal 120 is finally notified of the transition operation failure to the RRC connected state.

Figure 17:
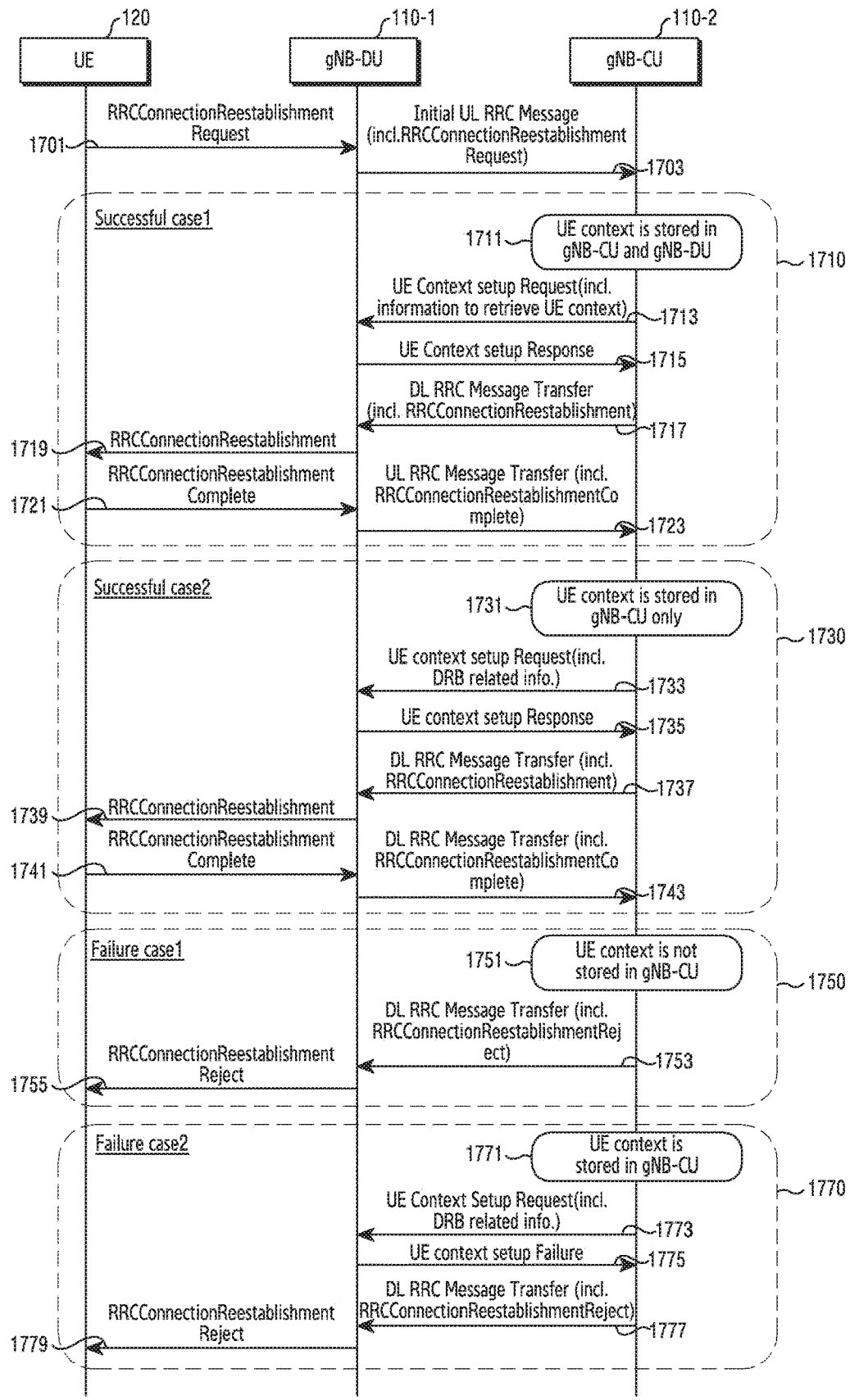
FIG. 17 illustrates another signal exchange diagram for an RRC reestablishment procedure in a wireless communication system according to various embodiments of the present disclosure.

FIG. 17 illustrates another signal exchange diagram for an RRC reestablishment procedure in a wireless communication system according to various embodiments of the present disclosure.

Referring to FIG. 17, in step 1601, the terminal 120 transmits an RRC connection reestablishment request message for transition to the RRC connected state. In step 1603, the distributed unit 110-1 transmits an initial uplink RRC message. That is, the distributed unit 110-1 includes and transfers a corresponding RRC message (e.g., the RRC connection reestablishment request message) in a non-UE related F1-AP initial uplink RRC message transfer message. Next, the procedure divides into a first successful case 1610, a second successful case 1630, a first failure case 1650, and a second failure state 1670.

According to the first successful case 1610, in step 1611, the central unit 110-2 successfully retrieves UE context stored in the distributed unit 110-1 and the central unit 110-2. Next, in step 1613, the central unit 110-2 transmits a UE context setup request message including information for retrieving the UE context. In step 1615, the distributed unit 110-1 transmits a UE context setup response message. In step 1617, the central unit 110-2 transmits a downlink RRC message transfer message including an RRC connection reestablishment message. In step 1619, the distributed unit 110-1 transmits the RRC connection reestablishment message. In step 1621, the terminal 120 transmits an RRC connection reestablishment complete message. In step 1623, the distributed unit 110-1 encapsulates the RRC message, that is, the RRC connection reestablishment complete message, in an F1-AP uplink RRC message transfer message, and transmits the uplink RRC message transfer message to the central unit 110-2.

According to the second successful case 1630, in step 1631, the central unit 110-2 successfully retrieves the UE context stored in the central unit 110-2. Next, in step 1633, the central unit 110-2 transmits a UE context setup request message including data radio bearer related information. In step 1635, the distributed unit 110-1 transmits a UE context setup response message. In step 1637, the central unit 110-2 transmits a downlink RRC message transfer message including the RRC connection reestablishment message. In step 1639, the distributed unit 110-1 transmits the RRC connection reestablishment message. In step 1641, the terminal 120 transmits an RRC connection reestablishment complete message. In step 1643, the distributed unit 110-1 encapsulates the RRC message, that is, the RRC connection reestablishment complete message, in the F1-AP uplink RRC message transfer message, and transmits the uplink RRC message transfer message to the central unit 110-2.

According to the first failure case 1650, in step 1651, since the UE context is not stored in the central unit 110-2, the central unit 110-2 fails to retrieve the UE context. In step 1653, the central unit 110-2 transmits a downlink RRC message transfer message including an RRC connection reestablishment reject message. In step 1655, the distributed unit 110-1 transmits the RRC connection reestablishment reject message to the terminal 120.

According to the second failure case 1670, in step 1671, the central unit 110-2 successfully retrieves the UE context stored in the central unit 110-2. Next, in step 1673, the central unit 110-2 transmits a UE context setup request message including data radio bearer related information. At this time, the distributed unit 110-1 determines that the terminal 120 is unacceptable, and transmits a UE context setup failure message, in step 1675. In step 1677, the central unit 110-2 transmits a downlink RRC message transfer message including the RRC connection reestablishment reject message. In step 1679, the distributed unit 110-1 transmits the RRC connection reestablishment reject message to the terminal 120.

The procedures of FIG. 16 and FIG. 17 are all related to the RRC connection reestablishment. The procedure of FIG. 16 has a technical advantage in that it may reduce latency of the connection reestablishment in some cases, and the procedure of FIG. 17 has a technical advantage in that there is no operation of adding the resource allocation configuration information (e.g., radio Resource Config Dedicated) and the reject indication.

Figure 18:
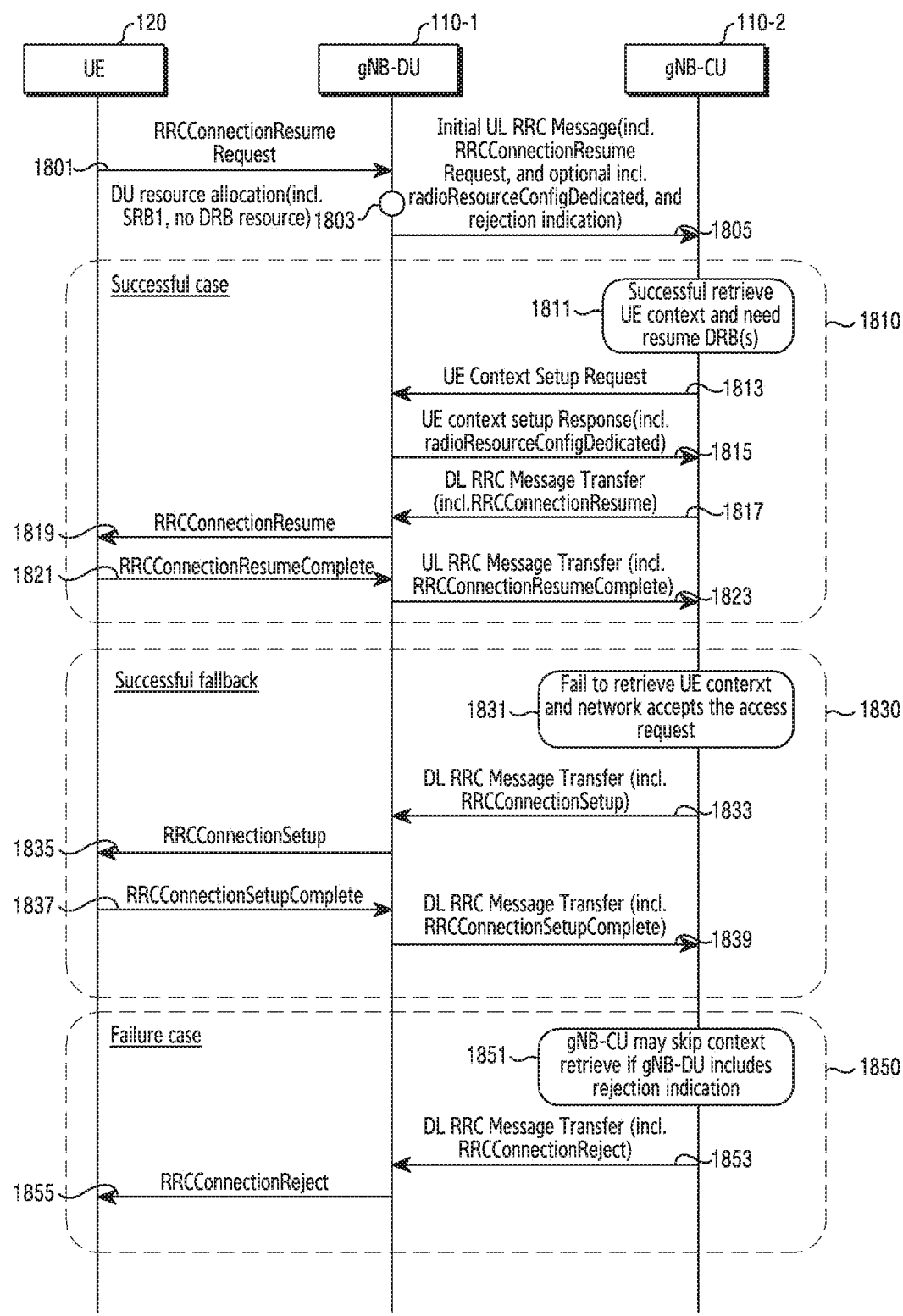
FIG. 18 illustrates a signal exchange diagram for an RRC resume procedure in a wireless communication system according to various embodiments of the present disclosure.

FIG. 18 illustrates a signal exchange diagram for an RRC resume procedure in a wireless communication system according to various embodiments of the present disclosure.

Referring to FIG. 18, in step 1801, the terminal 120 transmits an RRC connection resume request message for transition to the RRC connected state. In step 1803, the distributed unit 110-1 allocates resources. Herein, the resources may include a signaling radio bearer (SRB). In step 1805, the distributed unit 110-1 transmits an initial uplink RRC message. That is, the distributed unit 110-1 includes and transfers the corresponding RRC message (e.g., RRC connection resume request message) in a non-UE related F1-AP initial uplink RRC message transfer message. In addition, the initial uplink RRC message transfer message may include C-RNTI of the terminal 120, and may further include at least one of resource allocation configuration information (e.g. radio Resource Config Dedicated) and a reject indication. Next, the procedure divides into a successful case 1810, a successful fallback case 1830, and a failure case 1850.

According to the first successful case 1810, in step 1811, the central unit 110-2 successfully retrieves UE context stored in the distributed unit 110-1 and the central unit 110-2, and determines to resume at least one data radio bearer. Accordingly, the central unit 110-2 may allocate a CU UE F1AP ID for the terminal 120. In step 1813, the central unit 110-2 transmits a UE context setup request message. In step 1815, the distributed unit 110-1 transmits a UE context setup response message including resource allocation information (e.g., radio Resource Config Dedicated) for at least one data radio bearer. In step 1817, the central unit 110-2 transmits a downlink RRC message transfer message including the RRC connection resume message. In step 1819, the distributed unit 110-1 transmits the RRC connection resume message. In step 1821, the terminal 120 transmits an RRC connection resume complete message. In step 1823, the distributed unit 110-1 transmits an uplink RRC message transfer message including the RRC message, that is, the RRC connection reestablishment complete message, to the central unit 110-2.

According to the successful fallback case 1830, in step 1831, the central unit 110-2 fails to retrieve the UE context and determines to accept an access request. Accordingly, the central unit 110-2 may assign a CU UE F1AP ID for the terminal 120. Next, in step 1833, the central unit 110-2 generates an RRC connection setup message, and encapsulates and transmits the RRC connection setup message in a downlink RRC message transfer message. In step 1835, the distributed unit 110-1 transmits the RRC connection setup message. In step 1837, the terminal 120 transmits an RRC connection setup complete message. In step 1839, the distributed unit 110-1 encapsulates the corresponding RRC message in an F1-AP uplink RRC message transfer message, and transmits the F1-AP uplink RRC message transfer message.

According to the failure case 1850, in step 1851, since the distributed unit 110-1 has included the reject indication, the central unit 110-2 omits the context retrieval. The second failure case 1850 is an example corresponding to a case where the reject indication is included in the initial uplink RRC message transfer message transmitted in step 1805. That is, the second failure case 1870 is the case where the distributed unit 110-1 determines the RRC connection reject before transmitting the initial uplink RRC message transfer message, and the distributed unit 110-1 includes the initial uplink RRC message transfer message to notify the rejection case. In step 1873, the central unit 110-2 transmits a downlink RRC message transfer message including an RRC connection reestablishment reject message. In other words, the central unit 110-2 receiving the initial uplink RRC message transfer message including the reject indication does not perform a new UE context assignment operation, and directly transmits a downlink RRC message transfer message including the RRC connection reject message. In step 1875, the distributed unit 110-1 transmits the RRC connection reestablishment reject message to the terminal 120. That is, the distributed unit 110-1 receiving the downlink RRC message transfer message including the RRC connection reject message transfers the corresponding RRC message to the terminal 120, so that the terminal 120 is finally notified of the transition operation failure to the RRC connected state.

Figure 19:
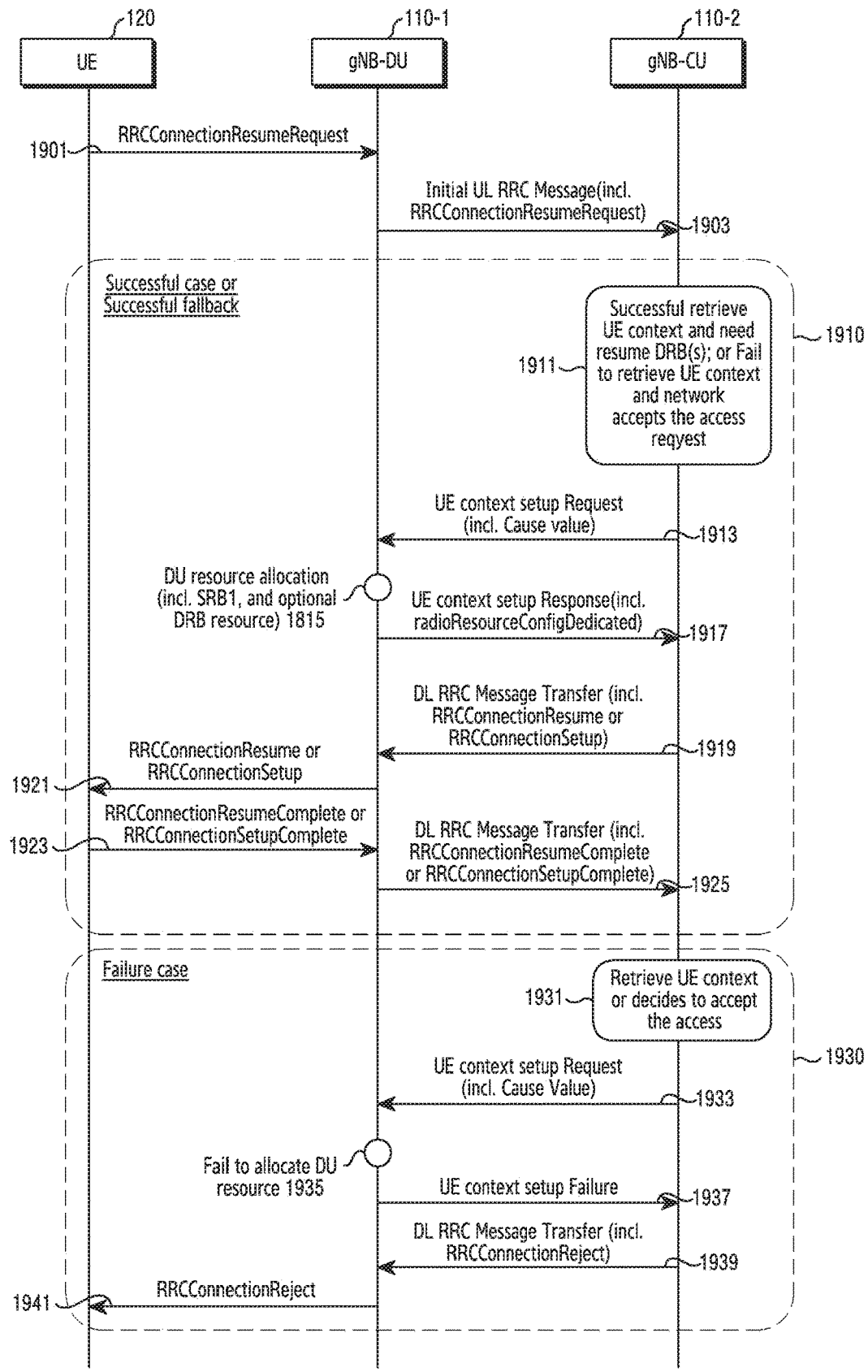
FIG. 19 illustrates another signal exchange diagram for an RRC resume procedure in a wireless communication system according to various embodiments of the present disclosure.

FIG. 19 illustrates another signal exchange diagram for an RRC resume procedure in a wireless communication system according to various embodiments of the present disclosure.

Referring to FIG. 19, in step 1801, the terminal 120 transmits an RRC connection resume request message for transition to the RRC connected state. In step 1803, the distributed unit 110-1 transmits an initial uplink RRC message. That is, the distributed unit 110-1 includes and transfers the corresponding RRC message (e.g., the RRC connection resume request message) in a non-UE related F1-AP initial uplink RRC message transfer message. Next, the procedure divides into a successful case 1810 and a failure case 1830.

According to the successful case 1810, in step 1811, the central unit 110-2 successfully retrieves UE context stored in the distributed unit 110-1 and the central unit 110-2, and determines to resume at least one data radio bearer. Alternatively, the central unit 110-2 fails to retrieve the UE context, and determines to accept an access request. Hence, in step 1813, the central unit 110-2 transmits a UE context setup request message including a cause value. In step 1815, the distributed unit 110-1 allocates resources. Herein, the resources may include a signaling radio bearer (SRB). In step 1817, the distributed unit 110-1 transmits a UE context setup response message including resource allocation information (e.g., radio Resource Config Dedicated) of at least one data radio bearer. In step 1819, the central unit 110-2 transmits a downlink RRC message transfer message including an RRC connection resume message or an RRC connection setup message. For example, the RRC connection resume message may be included if the context retrieve is successful in step 1811, and the RRC connection setup message may be included if the context retrieve fails. In step 1821, the distributed unit 110-1 transmits the RRC connection resume message or the RRC connection setup message. In step 1823, the terminal 120 transmits an RRC connection resume complete message or an RRC connection setup complete message. In step 1825, the distributed unit 110-1 transmits an uplink RRC message transfer message including the RRC message, that is, the RRC connection reestablishment complete message or the RRC connection setup complete message to the central unit 110-2.

According to the failure case 1830, in step 1831, the central unit 110-2 succeeds in retrieving the UE context, or determines to accept the access. Hence, in step 1833, the central unit 110-2 transmits a UE context setup request message including a cause value. In step 1835, the distributed unit 110-1 fails to allocate resources. That is, the distributed unit 110-1 determines that the terminal 120 is not acceptable. In step 1837, the distributed unit 110-1 transmits a UE context setup failure message. In step 1839, the central unit 110-2 transmits a downlink RRC message transfer message including an RRC connection reject message. In step 1841, the distributed unit 110-1 transmits the RRC connection reject message to the terminal 120.

The procedures of FIG. 18 and FIG. 19 are all related to the RRC connection resume. The procedure of FIG. 18 has technical advantages of allowing flexible implementation and reducing latency for the resume. The procedure of FIG. 19 has a technical advantage of providing an integrated procedure for the successful case.

Figure 20:
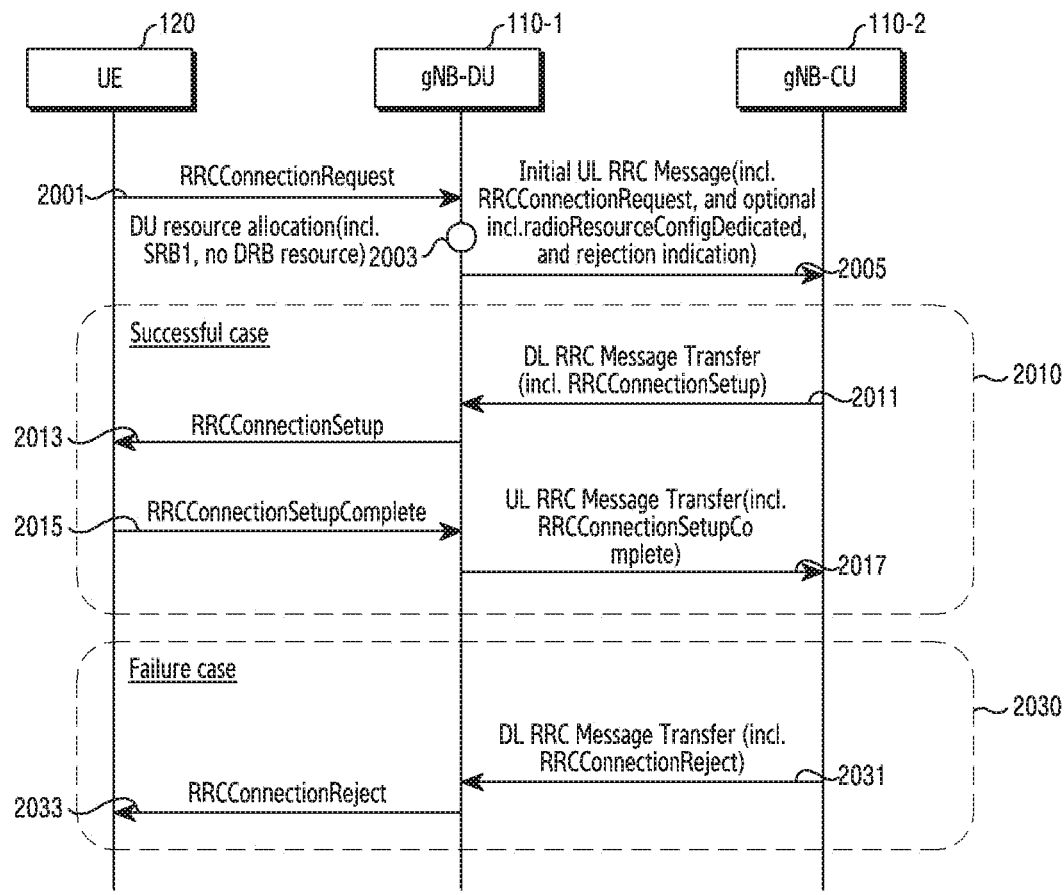
FIG. 20 illustrates a signal exchange diagram for an initial access procedure in a wireless communication system according to various embodiments of the present disclosure.

FIG. 20 illustrates a signal exchange diagram for an initial access procedure in a wireless communication system according to various embodiments of the present disclosure.

Referring to FIG. 20, in step 2001, the terminal 120 transmits an RRC connection request message for transition to the RRC connected state. In step 2003, the distributed unit 110-1 allocates resources. Herein, the resources may include a signaling radio bearer (SRB). In step 2005, the distributed unit 110-1 transmits an initial uplink RRC message. That is, the distributed unit 110-1 includes and transfers the corresponding RRC message (e.g., the RRC connection request message) in a non-UE related F1-AP initial uplink RRC message transfer message. In addition, the initial uplink RRC message transfer message may include C-RNTI of the terminal 120, and may further include at least one of resource allocation configuration information (e.g. radio Resource Config Dedicated) and a reject indication. Next, the procedure divides into a successful case 2010 and a failure case 2030.

According to the successful case 2010, in step 2011, the central unit 110-2 transmits a downlink RRC message transfer message including an RRC connection setup message. In step 2013, the distributed unit 110-1 transmits an RRC connection setup message. In step 2015, the terminal 120 transmits an RRC connection setup complete message. In step 2017, the distributed unit 110-1 transmits an uplink RRC message transfer message including the RRC connection setup complete message.

According to the failure case 2030, in step 2031, the central unit 110-2 transmits a downlink RRC message transfer message including an RRC connection reject message. In step 2033, the distributed unit 110-1 transmits the RRC connection reject message to the terminal 120. That is, the terminal 120 is finally notified of the transition operation failure to the RRC connected state.

Figure 21:
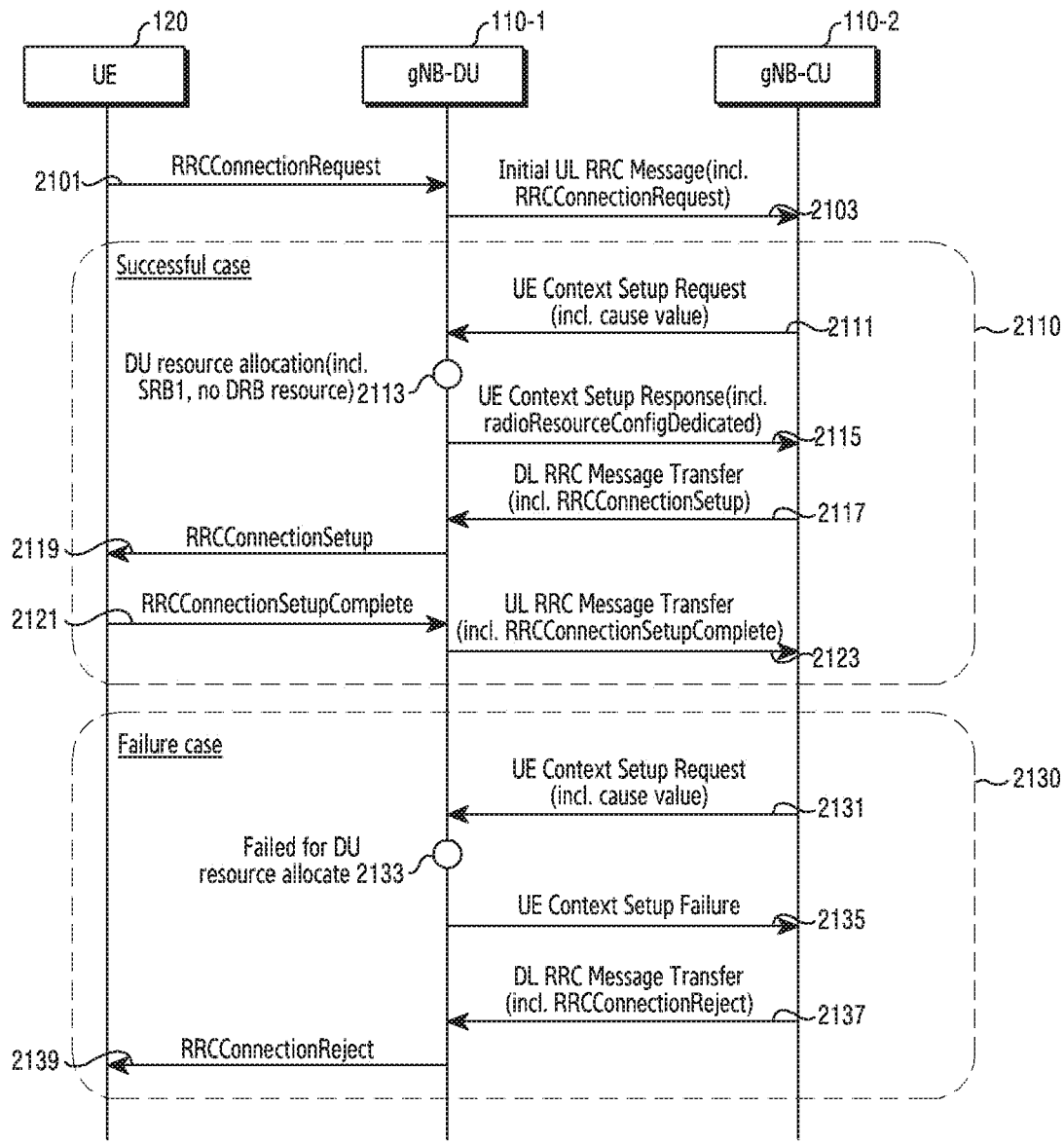
FIG. 21 illustrates another signal exchange diagram for an initial access procedure in a wireless communication system according to various embodiments of the present disclosure.

FIG. 21 illustrates another signal exchange diagram for an initial access procedure in a wireless communication system according to various embodiments of the present disclosure.

Referring to FIG. 21, in step 2101, the terminal 120 transmits an RRC connection request message for transition to the RRC connected state. In step 2103, the distributed unit 110-1 transmits an initial uplink RRC message. That is, the distributed unit 110-1 includes and transfers the corresponding RRC message (e.g., the RRC connection request message) in a non-UE related F1-AP initial uplink RRC message transfer message. Next, the procedure divides into a successful case 2110 and a failure case 2130.

According to the successful case 2110, in step 2111, the central unit 110-2 transmits a UE context setup request message including a cause value. In step 2113, the distributed unit 110-1 allocates resources. Herein, the resources may include a signaling radio bearer (SRB). In step 2115, the distributed unit 110-1 transmits a UE context setup response message including resource allocation information (e.g., radio Resource Config Dedicated) of at least one data radio bearer. In step 2117, the central unit 110-2 transmits a downlink RRC message transfer message including an RRC connection setup message. In step 2119, the distributed unit 110-1 transmits the RRC connection setup message. In step 2121, the terminal 120 transmits an RRC connection setup complete message. In step 2123, the distributed unit 110-1 transmits an uplink RRC message transfer message including the RRC message, that is, the RRC connection setup complete message to the central unit 110-2.

According to the failure case 2130, in step 2131, the central unit 110-2 transmits a UE context setup request message including a cause value. In step 2133, the distributed unit 110-1 fails in the resource allocation. That is, the distributed unit 110-1 determines that the terminal 120 is not acceptable. In step 2135, the distributed unit 110-1 transmits a UE context setup failure message. In step 2137, the central unit 110-2 transmits a downlink RRC message transfer message including an RRC connection reject message. In step 2139, the distributed unit 110-1 transmits the RRC connection reject message to the terminal 120.

The methods according to the embodiments described in the claims or the specification of the disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling the electronic device to execute the methods according to the embodiments described in the claims or the specification of the disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, it may be stored to a memory combining part or all of those recording media. A plurality of memories may be included.

Also, the program may be stored in an attachable storage device accessible via a communication network such as Internet, Intranet, local area network (LAN), wide LAN (WLAN), or storage area network (SAN), or a communication network by combining these networks. Such a storage device may access a device which executes an embodiment of the present disclosure through an external port. In addition, a separate storage device on the communication network may access the device which executes an embodiment of the present disclosure.

In the specific embodiments of the disclosure, the elements included in the disclosure are expressed in a singular or plural form. However, the singular or plural expression is appropriately selected according to a proposed situation for the convenience of explanation, the disclosure is not limited to a single element or a plurality of elements, the elements expressed in the plural form may be configured as a single element, and the elements expressed in the singular form may be configured as a plurality of elements.

Meanwhile, while the specific embodiment has been described in the explanations of the present disclosure, it will be noted that various changes may be made therein without departing from the scope of the disclosure. Thus, the scope of the disclosure is not limited and defined by the described embodiment and is defined not only the scope of the claims as below but also their equivalents.

The invention claimed is:

1. A method performed by a distributed unit (DU) of a base station, the method comprising:
 receiving, from a terminal, a radio resource control (RRC) message;
 in case that the terminal is not acceptable in the DU, generating a transfer message for an initial uplink (UL) RRC message by not including an information element for the RRC message in the transfer message;
 transmitting, to a central unit (CU), the transfer message;

in response to the transfer message not including the information element for the RRC message, receiving, from the CU, a response message indicating to reject a procedure requested by the RRC message, wherein the information element for the RRC message is used to indicate that the terminal is acceptable in the DU by being included in the transfer message.

2. The method of claim 1,
wherein the RRC message indicates a transition to an RRC connected state from an RRC inactive state or a transition to the RRC connected state from an RRC idle state, and
wherein a procedure requested by the RRC message comprises one of an RRC connection procedure, an RRC connection resume procedure, and an RRC connection reestablishment procedure.

3. The method of claim 2, wherein the procedure requested by the first control message is rejected according to failure of resource allocation of a media access control (MAC) layer and a physical (PHY) layer for a signaling radio bearer (SRB) for transmitting an RRC message.

4. The method of claim 1, wherein the transfer message indicates a rejection for the terminal in case that the information element for the RRC message is not included in the transfer message.

5. The method of claim 1, wherein the information element for the RRC message comprises an RRC container information element.

6. The method of claim 1, wherein the transfer message comprises:
information on a cell-radio network temporary identifier (C-RNTI) of the terminal; and
information on a user equipment (UE) F1 application identity (UE F1AP ID) for the DU.

7. An apparatus of a distributed unit (DU) of a base station, the apparatus comprising:
at least one transceiver; and
at least one processor configured to:
receive, from a terminal via the at least one transceiver, a radio resource control (RRC) message,
in case that the terminal is not acceptable in the DU, generate a transfer message for an initial uplink (UL) RRC message by not including an information element for the RRC message in the transfer message,
transmit, to a central unit (CU), the transfer message, and
in response to the transfer message not including the information element for the RRC message, receive, from the CU via the at least one transceiver, a response message indicating to reject a procedure requested by the RRC message,
wherein the information element for the RRC message is used to indicate that the terminal is acceptable in the DU by being included in the transfer message.

8. The apparatus of claim 7,
wherein the RRC message indicates a transition to an RRC connected state from an RRC inactive state or a transition to the RRC connected state from an RRC idle state, and
wherein a procedure requested by the RRC message comprises one of an RRC connection procedure, an RRC connection resume procedure, and an RRC connection reestablishment procedure.

9. The apparatus of claim 8, wherein the procedure requested by the first control message is rejected according to failure of resource allocation of a media access control (MAC) layer and a physical (PHY) layer for a signaling radio bearer (SRB) for transmitting an RRC message.

10. The apparatus of claim 7, wherein the transfer message indicates a rejection for the terminal in case that the information element for the RRC message is not included in the transfer message.

11. The apparatus of claim 7, wherein the information element for the RRC message comprises an RRC container information element.

12. The apparatus of claim 7, wherein the transfer message comprises:
information on a cell-radio network temporary identifier (C-RNTI) of the terminal; and
information on a user equipment (UE) F1 application identity (UE F1AP ID) for the DU.

13. An apparatus of a central unit (CU) of a base station, the apparatus comprising:
at least one transceiver; and
at least one processor configured to:
receive, from a distributed unit (DU) via the at least one transceiver, a transfer message for an initial uplink (UL) radio resource control (RRC) message,
in case that information element for the RRC message is not included in the transfer message, identify that the terminal is not acceptable in the DU, and
in response to receiving the transfer message not including the information element for the RRC message, transmit a response message indicating to reject a procedure requested by the RRC message,
wherein the information element for the RRC message is used to indicate that the terminal is acceptable in the DU by being included in the transfer message.

14. The apparatus of claim 13,
wherein RRC message indicates a transition to an RRC connected state from an RRC inactive state or a transition to the RRC connected state from an RRC idle state, and
wherein a procedure requested by the RRC message comprises one of an RRC connection procedure, an RRC connection resume procedure, and an RRC connection reestablishment procedure.

15. The apparatus of claim 13, wherein the at least one processor is further configured to:
reject the terminal in case that the information element for the RRC message is not included in the transfer message.

16. The apparatus of claim 13, wherein the information element for the RRC message comprises an information element for an RRC container.

17. The apparatus of claim 13, wherein the transfer message comprises:
information on a cell-radio network temporary identifier (C-RNTI) of the terminal; and
information on a user equipment (UE) F1 application identity (UE F1 AP ID) for the DU.

* * * * *